United States Patent
Tzabari

(10) Patent No.: US 11,242,131 B2
(45) Date of Patent: Feb. 8, 2022

(54) HIGH-LIFT ACTUATION SYSTEM HAVING CENTRALIZED INBOARD ACTUATION CONTROL AND INDEPENDENT OUTBOARD ACTUATION CONTROL

(71) Applicant: Bombardier Inc., Dorval (CA)

(72) Inventor: Ehud Tzabari, St-Laurent (CA)

(73) Assignee: Bombardier Inc.

( * ) Notice: Subject to any disclaimer, the term of this patent is extended or adjusted under 35 U.S.C. 154(b) by 140 days.

(21) Appl. No.: 16/685,391

(22) Filed: Nov. 15, 2019

(65) Prior Publication Data
US 2020/0156764 A1 May 21, 2020

Related U.S. Application Data

(60) Provisional application No. 62/768,437, filed on Nov. 16, 2018.

(51) Int. Cl.
| | |
|---|---|
| *B64C 13/02* | (2006.01) |
| *B64C 9/02* | (2006.01) |
| *B64C 13/34* | (2006.01) |
| *B64C 13/40* | (2006.01) |
| *B64C 13/50* | (2006.01) |

(52) U.S. Cl.
CPC ............. *B64C 13/02* (2013.01); *B64C 9/02* (2013.01); *B64C 13/34* (2013.01); *B64C 13/40* (2013.01); *B64C 13/503* (2013.01)

(58) Field of Classification Search
CPC ......... B64C 13/02; B64C 13/34; B64C 13/40; B64C 13/503; B64C 13/341; B64C 13/505; B64C 9/02
See application file for complete search history.

(56) References Cited

U.S. PATENT DOCUMENTS

| | | | |
|---|---|---|---|
| 7,048,234 B2 | 5/2006 | Recksiek et al. | |
| 7,051,975 B2* | 5/2006 | Pohl | B64D 45/0005 |
| | | | 244/99.4 |
| 7,226,020 B2* | 6/2007 | Pohl | B64C 13/26 |
| | | | 244/213 |

(Continued)

FOREIGN PATENT DOCUMENTS

DE 102015201935 A1 8/2016

*Primary Examiner* — Rodney A Bonnette
(74) *Attorney, Agent, or Firm* — Fishman Stewart PLLC

(57) ABSTRACT

A high-lift actuation system for differentially actuating a plurality of high-lift surfaces of an aircraft is disclosed. An exemplary high-lift actuation system includes a centralized drive device for centralized actuation control of an inboard high-lift surface of a first wing and a second wing, respectively, and at least two independent drive devices for individual actuation control of an outboard high-lift surface of the first wing and the second wing, respectively. The centralized drive device may include a central power drive unit (PDU) operably coupled to a common central driveline for driving the inboard high-lift surfaces, and the common central driveline may be separate and spaced apart from a respective driveline of the independent drive devices. The common central driveline may mechanically synchronize movement of the inboard high-lift surfaces, and a controller may electronically coordinate synchronized movement and controlled differential movement of the plurality of high-lift surfaces.

19 Claims, 9 Drawing Sheets

(56) References Cited

U.S. PATENT DOCUMENTS

| | | | |
|---|---|---|---|
| 7,494,094 B2* | 2/2009 | Good | B64C 9/14 244/215 |
| 2006/0043242 A1* | 3/2006 | Benson | B64C 13/503 244/175 |
| 2020/0070953 A1* | 3/2020 | Tzabari | B64C 9/12 |
| 2020/0156766 A1* | 5/2020 | Tzabari | B64C 9/02 |

* cited by examiner

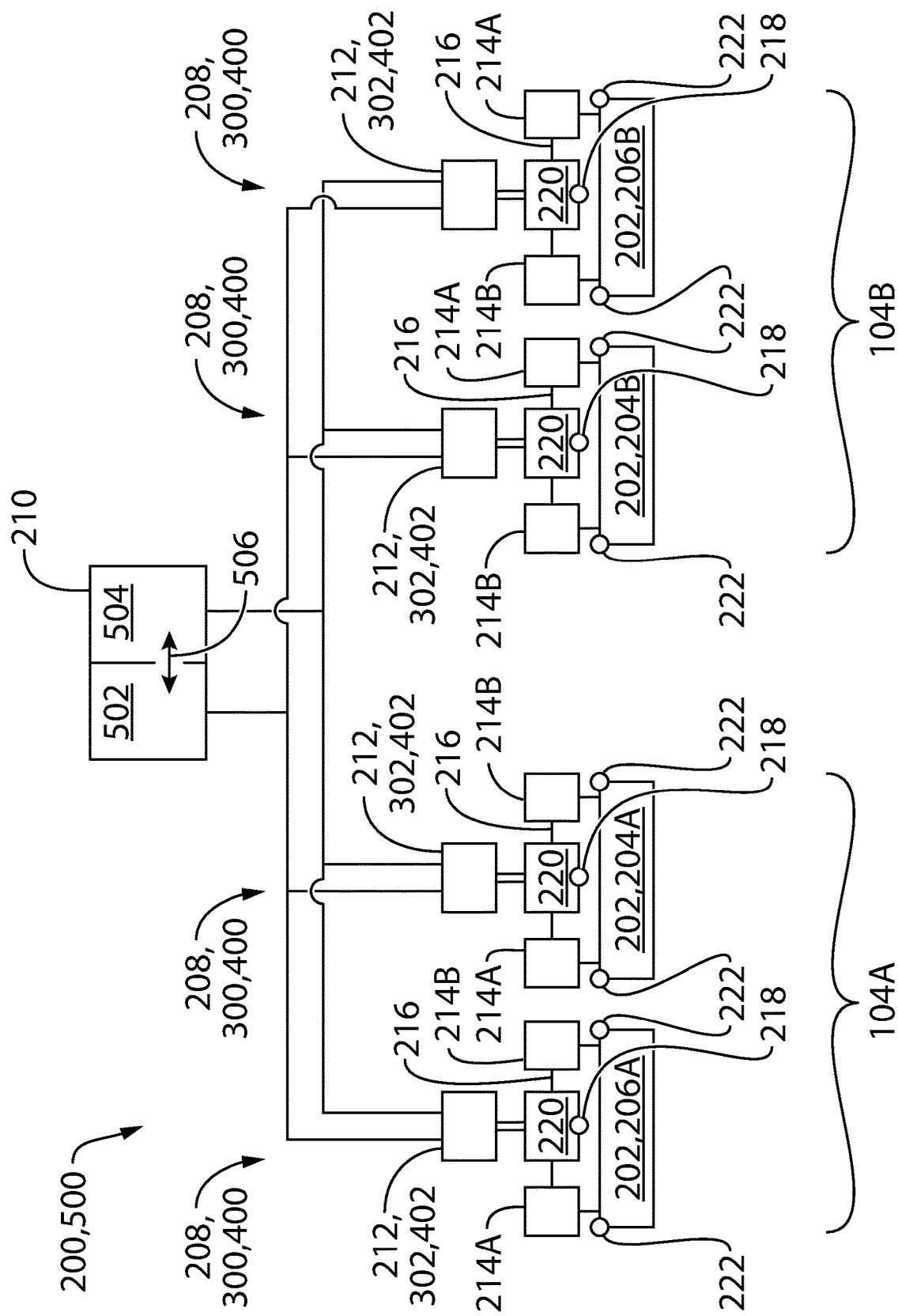

HIGH-LIFT ACTUATION SYSTEM HAVING CENTRALIZED INBOARD ACTUATION CONTROL AND INDEPENDENT OUTBOARD ACTUATION CONTROL

CROSS-REFERENCE TO RELATED APPLICATIONS

This application claims priority to U.S. Provisional Patent Application No. 62/768,437, filed on Nov. 16, 2018, the contents of which are hereby incorporated by reference in its entirety.

TECHNICAL FIELD

The present disclosure relates generally to actuation of flight control surfaces of an aircraft, and more particularly to a high-lift actuation system of an aircraft.

BACKGROUND

Many fixed-wing aircraft comprise high-lift flight control surfaces that are deployed and/or retracted to change an amount of lift generated by a wing during some phases of flight. On some aircraft, such high-lift flight control surfaces may comprise a plurality of leading edge slats and also a plurality of trailing edge flaps. The actuation system of an aircraft may consist of a central drive unit located in the middle of an aircraft fuselage, a shared transmission shaft system and local mechanical actuators on corresponding support stations of the movable slats or flaps. Arranging the central drive unit of a shared shaft system in the region of the fuselage requires significant drive power and substantial changes in angle for torque transmission to the high-lift surfaces on each wing. Accordingly, the central drive unit is usually driven by two motors that are active in parallel, with the drive output of the motors being transferred to the shaft system by way of a differential gearbox (e.g., a speed sum arrangement). A differential gearbox, also referred to as a speed summing gearbox, is characterized by a gear train with three shafts operably coupled such that the rotation speed of one shaft is the sum of the speeds of the others, and is relatively heavy and complex. The central drive unit actuates the high-lift flight control surfaces simultaneously in unison, e.g., the inboard and outboard trailing edge flaps are actuated as a single system. This central drive unit architecture assures synchronous deployment of all high-lift surfaces coupled to the system but may hinder functional flexibility and may increase cabin noise due to the arrangement of motors in a region of the fuselage. Additionally, synchronized coupling of high-lift surfaces via a shared transmission shaft system results in considerable installation expenditure with a multitude of mechanical components such as transmission shaft sections, joints, bearings, and angular gear arrangements.

It may be desirable to actuate the outboard devices at different times and/or to different positions relative to the inboard devices and relative to each other, for example to vary the camber of the wing. Variable camber systems are often used in aircraft to change the curvature (camber) of the wing. In conventional common shaft systems, independent surface actuation (e.g., variable camber) may require a complex architecture of differential gearboxes separating the inboard and outboard devices on each wing. To implement the independent flap actuation, a secondary drive unit with a differential gearbox may be coupled to the transmission shafts of adjacent flaps in addition to the central drive unit. The speed of the transmission shafts at the output of the differential gearbox depends on the input speeds of the central drive unit and also the secondary drive unit, as the output speed is the sum of the two input speeds and is thus largely independent of the speed of the transmission shaft driven by the central drive unit.

Alternatively, some variable camber systems may use individual drive units that individually drive each high-lift surface to increase system flexibility. The individual drive units may comprise, for example, a dual motor speed summing arrangement where two motors deliver their respective outputs to a differential gearbox that combines/sums the outputs of the two motors. In such a dual motor speed summing arrangement, the individual motors may require a dedicated motor brake to stop the respective motor outputs from rotating, for example in the case of a failure of one motor, to enable the remaining motor to operate the high-lift surface. If the output of the failed motor is not fixed or otherwise stopped by an associated motor brake, then the output of the operational motor may back drive the failed motor and there will be little or no power transmission at the differential output. In some implementations, the differential gearbox may be provided with a differential lock to lock the differential and stop rotation of the associated high-lift surface, which increases overall weight and system complexity.

Other approaches for variable camber systems may use individual drive units that comprise a distributed system of direct drive actuators having integrated motors installed on either side of a high-lift surface, which may be interconnected via a transmission shaft or may be arranged in a fully distributed manner without mechanical interaction. The arrangement of direct drive actuators on either side of the high-lift surface may increase the torque (twisting) of the high-lift surface, resulting in reduced service life or potentially impaired operation.

Overcoming these concerns would be desirable. Thus, there is a need for improved high-lift architectures and systems that minimize complexities while enabling independent actuation of outboard and inboard devices.

BRIEF DESCRIPTION OF THE DRAWINGS

While the claims are not limited to a specific illustration, an appreciation of the various aspects is best gained through a discussion of various examples thereof. Although the drawings represent illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrates are described in detail by referring to the drawings as follows:

FIG. 5 illustrates the high-lift actuation system of FIG. 2 according to an implementation;

DETAILED DESCRIPTION

Figure 1:
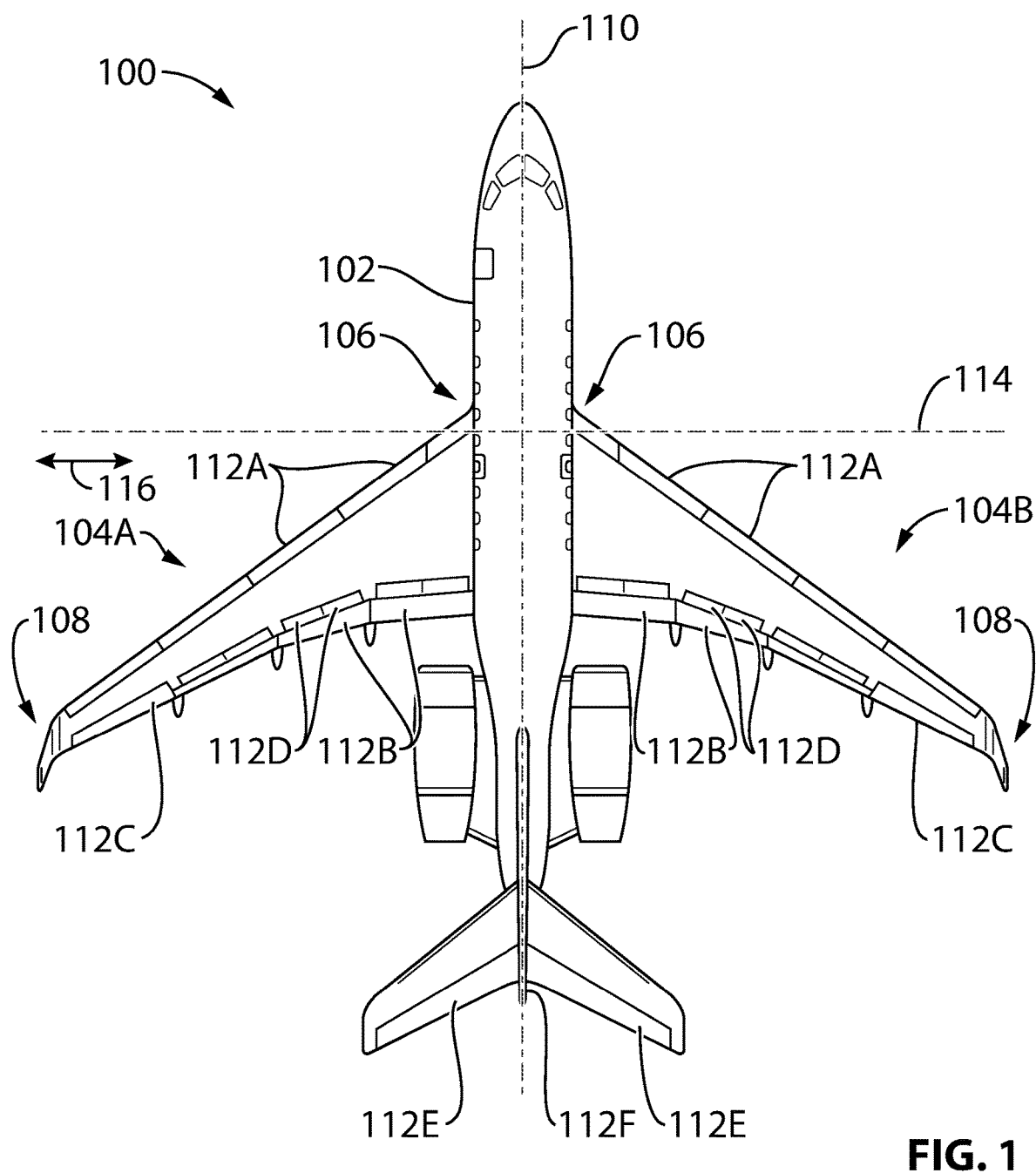
FIG. 1 illustrates a top plan view of an exemplary aircraft.

In the drawings, where like numerals and characters indicate like or corresponding parts throughout the several views, exemplary illustrates are shown in detail. The various features of the exemplary approaches illustrated and described with reference to any one of the figures may be combined with features illustrated in one or more other figures, as it will be understood that alternative illustrations that may not be explicitly illustrated or described may be able to be produced. The combinations of features illustrated provide representative approaches for typical applications. However, various combinations and modifications of the features consistent with the teachings of the present disclosure may be desired for particular applications or implementations.

The present disclosure relates to the actuation of flight control surfaces such as high-lift surfaces of aircraft and describes exemplary high-lift actuation systems. The exemplary high-lift actuation systems may include one or more independent drive devices for individually actuating a high-lift surface. According to one aspect, there is provided a plurality of independent drive devices for individually actuating a plurality of high-lift surfaces without mechanical interaction between the respective drive devices. According to another aspect, there is provided a centralized drive device for centralized control of at least two high-lift surfaces (e.g., a first and second inboard high-lift surface on a first and second wing, respectively) and at least two independent drive devices for individual control of a single high-lift surface (e.g., an outboard high-lift surface on each of the first and second wing). Implementations of the disclosure may include combinations of the details and features of the various aspects described herein.

In various aspects, the present disclosure describes systems, components, apparatus and methods useful in the actuation of high-lift surfaces of aircraft or other actuatable members. The systems, components, devices and methods disclosed herein may, for example, be useful in the differential actuation of high-lift surfaces such as leading edge slats and/or trailing edge flaps of fixed-wing aircraft. However, it is understood that systems, components, devices and methods disclosed herein may be used in conjunction with other types of flight control surfaces and with other types of aircraft than those exemplified herein. Differential actuation of high-lift surfaces, as referenced in the present disclosure, is intended to encompass actuation of two or more high-lift surfaces (e.g., per wing side) by different amounts (e.g., to achieve different position settings relative to each other) and/or in different directions (e.g., a retract direction and an extend direction), whether via simultaneous actuation or not (e.g., including separate actuation at different times). It is also understood that, in various aspects, the systems, components, devices and methods disclosed herein may be used for other type(s) of actuation including, for example, simultaneous actuation of a plurality of high-lift surfaces in unison (e.g., synchronously) or the actuation of at least a single flight control surface (e.g., asynchronously). It is also understood that, the systems, components, devices and methods disclosed herein may be used in conjunction with actuatable members (e.g., in aerospace or non-aerospace applications) other than those exemplified herein.

In some aspects, the systems, components, devices and methods disclosed herein may, for example, permit the tailoring of a lift distribution along a spanwise direction of a wing of a fixed-wing aircraft (e.g., during flight). For example, the differential actuation of high-lift surfaces along a wing may be used to selectively adjust the camber of the wing by different amounts at different spanwise locations of the wing by deploying individual high-lift surfaces disposed at different spanwise locations of the wing by different amounts. This includes synchronous motion where two or more high-lift surfaces of the wing are moved simultaneously in unison, asynchronous motion where at least one high-lift surface moves relative to at least one stationary high-lift surface of the wing, and/or asynchronous motion where two or more high-lift surfaces are moved at different speeds relative to one another. The high-lift surfaces may be movable (e.g., extend and retract) to various positions within a full or predefined range of motion to influence the lift of the aircraft. For example, the individual high-lift surfaces may be moved by 10%, 15%, 25%, 35%, etc., of their full range of motion. Among other benefits, the selective tailoring of the lift distribution along the spanwise direction of the wing may permit, for example, shifting a resultant lift force on a wing closer to the root of the wing (i.e., inboard) to alleviate the bending moment induced on the wing by the lift generated by the wing. Further, differentially actuating or adjusting the individual high-lift surfaces to move to different relative positions or move by different incremental motions (e.g., the outboard high-lift surface of a wing may be deflected by 10% while the inboard high-lift surface may be deflected by 12%) may facilitate optimal positioning of the high-lift surfaces to reduce drag and/or increase lift and thus improve fuel efficiency. Other spanwise lift distributions may be suitable for different phases of flight and/or conditions.

Implementations of the disclosure may include combinations of the above-described features. Details of these and other aspects of the disclosure will be apparent from the following discussion of non-limiting examples of a high-lift actuation system of an aircraft.

Referring now to FIG. 1, there is shown an exemplary aircraft generally at 100, with which one or more of the systems, components, apparatus and methods of the present disclosure may be incorporated. Aircraft 100 may, for example, include any suitable aircraft such as corporate, private, commercial or any other type of aircraft that may comprise one or more flight control surfaces. Aircraft 100 may be a fixed-wing aircraft, but it is understood that aspects of the present disclosure could also apply to rotary-wing aircraft. Aircraft 100 may, for example, be a narrow-body, twin engine jet airliner. The aircraft 100 may include a fuselage 102 and wings 104A, 104B attached to the fuselage 102 at a wing root 106 extending outwardly or in an outboard direction toward a wing tip 108 along a transverse axis or lateral axis or pitch axis 114 (hereafter "transverse axis 114"). In the illustrated example, the aircraft 100 has a pair of wings 104A, 104B attached to opposite sides of the fuselage 102 with respect to a roll axis or longitudinal axis or central longitudinal axis 110 (hereafter "longitudinal axis 110"), the pair of wings 104 comprising a first wing or left wing or a left-hand wing 104A (hereafter "first wing 104A") and a second wing or right wing or right-hand wing 104B (hereafter "second wing 104B"). Each wing 104A, 104B may comprise one or more movable flight control surfaces (e.g., 112A-112F). For example, each wing 104A, 104B may comprise one or more high-lift flight control surfaces including one or more leading edge slats 112A and/or one or more trailing edge flaps 112B. Leading edge slats 112A may comprise a plurality of surfaces distributed in a spanwise direction 116 along wing 104A, 104B and disposed at or near a leading edge of the wing 104A, 104B. Trailing edge flaps 112B may also comprise a plurality of surfaces distributed in a spanwise direction 116 along wing 104A, 104B and may be disposed at or near a trailing edge of wing 104A, 104B. The spanwise direction 116 is seen extending along the transverse axis 114 which runs parallel to wings 104A, 104B from wing tip 108 to wing tip 108 such that the transverse axis 114 intersects the longitudinal axis 110 of the aircraft 100. In various aspects, leading edge slats 112A and/or trailing edge flaps 112B may be considered "high-lift" surfaces or panels (hereafter "high-lift surfaces") that may be deployed to increase an amount of lift or reduce the amount of drag generated by wings 104A, 104B when deployed. For example, leading edge slats 112A and/or trailing edge flaps 112B may be deployed, on ground, during landing, take-off and/or during any other appropriate phases of flight or conditions requiring increased lift. Each wing 104A, 104B may also comprise one or more ailerons 112C and one or more spoilers 112D. Aircraft 10 may also comprise one or more elevators 112E and one or more rudders 112F.

Figure 2:
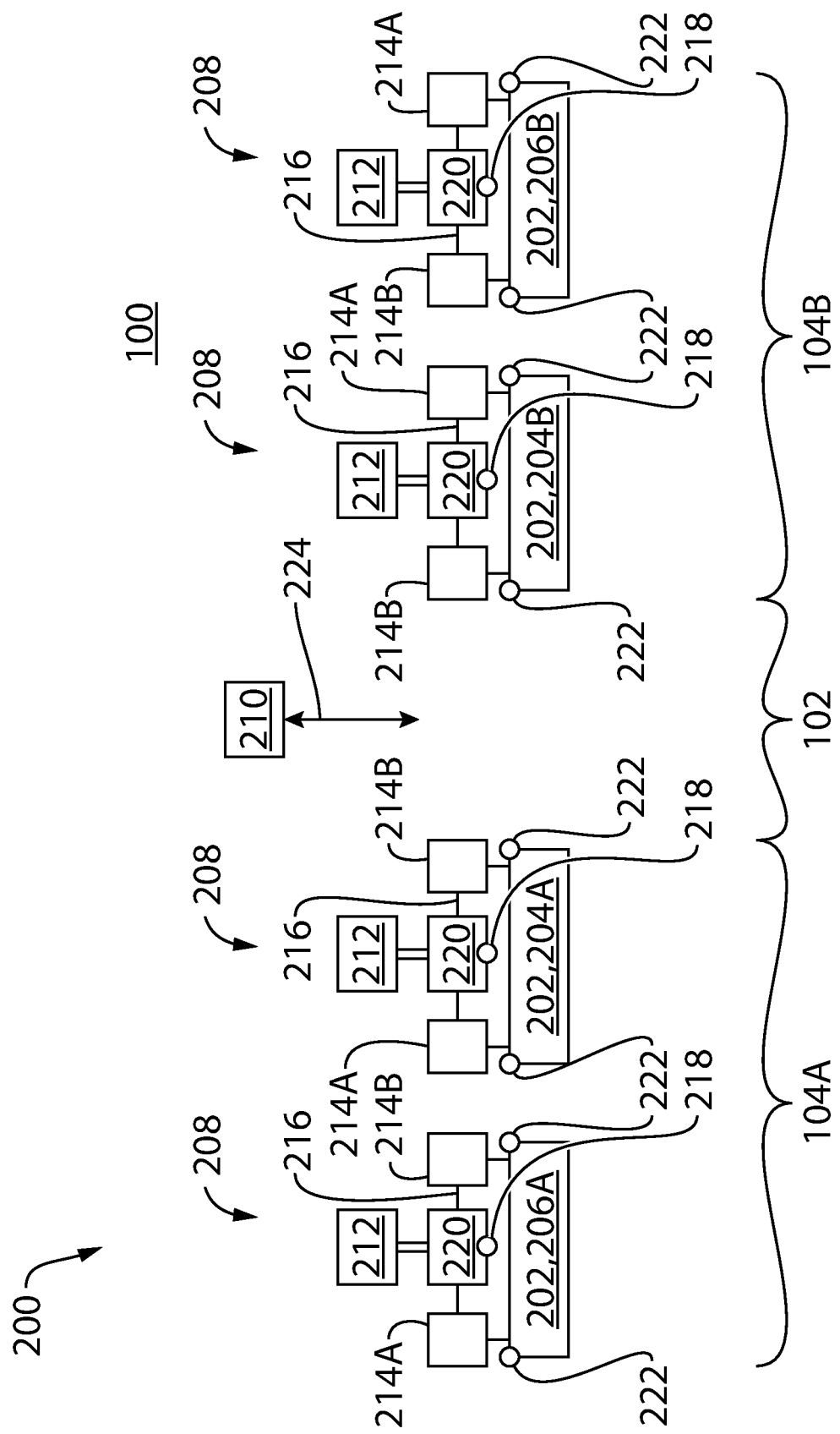
FIG. 2 illustrates a schematic representation of an exemplary high-lift actuation system for differentially actuating a plurality of high-lift surfaces of the aircraft of FIG. 1.

FIG. 2 is a schematic representation of an exemplary high-lift actuation system 200 for differentially actuating a plurality of high-lift surfaces 202 of the aircraft 100, such as trailing edge flaps 112B as one non-limiting example. The high-lift surfaces 202 are distributed in a spanwise direction 116 and include an inboard high-lift surface 204A, 204B and an outboard high-lift surface 206A, 206B on each wing 104A, 104B. The high-lift actuation system 200 includes a plurality of independent drive devices 208 for individually actuating the plurality of high-lift surfaces 202. The drive devices 208 are operable to move individual high-lift surfaces 202 to selected positions for lift-augmentation, wherein each high-lift surface 202 is movable between a retracted position and one or more extended positions via an associated independent drive device 208 without mechanical interaction between the respective drive devices 208 or high-lift surfaces 202. A controller 210 is functionally connected to each independent drive device 208, and may direct and coordinate the operation of the drive devices 208 (e.g., control, power, monitor, etc.) to provide unitary and differential motion between the inboard high-lift surfaces 204A, 204B and the outboard high-lift surfaces 206A, 206B. The high-lift actuation system 200 enables independent actuation of the high-lift surfaces 202 that offers the capability to drive outboard high-lift surfaces 206A, 206B differently from inboard high-lift surfaces 204A, 204B and differently between first and second wing 104A, 104B, including symmetric and asymmetric operation of the outboard high-lift surfaces 206A, 206B and/or the inboard high-lift surfaces 204A, 204B, with benefits on aircraft level (e.g., mass savings, fuel-efficiency, reduced drag, reduced wing bending moment, and an overall simple architecture) and improvements in cost and at manufacture. Functionalities that may be implemented by the high-lift actuation system 200 include, but are not limited to, synchronous high-lift control, variable camber control, wing load shifting, and roll trim.

The independent drive devices 208 respectively include a local power drive unit (PDU) 212, at least two actuators or actuation stations (hereafter "actuators 214A, 214B") mechanically coupled to a respective high-lift surface 202, and an interconnecting driveline 216. Each local PDU 212 is disposed remote from the fuselage 102 and may be arranged in a respective wing 104A, 104B of the aircraft 100. Further, each local PDU 212 may be arranged centrally relative to the associated high-lift surface 202 at a position intermediate to the actuators 214A, 214B arranged on either side of high-lift surface 202 in the spanwise direction 116. The local PDU 212 may, for example, comprise at least one suitably controlled electric or hydraulic motor (not shown in FIG. 2) or any other source of power suitable for actuating the driveline 216, a gearbox (not shown in FIG. 2) operably connecting the motor(s) to the driveline 216, and at least one position sensor 218. In some circumstances one or more PDUs 212 may include a motor brake (not shown) to stop the output of the motor from rotating or for safety (e.g., in the event of a failure condition). The respective PDUs 212 of the independent drive devices 208 may be independently operable to drive the high-lift surfaces 202, and may be controlled to drive the high-lift surfaces 202 synchronously, asynchronously, differentially (e.g., asymmetrically) and in unison (e.g., symmetrically) in response to command signals received from the controller 210.

The local PDU 212 of each drive device 208 exerts a rotational motion and drive power onto the driveline 216, and the respective high-lift surfaces 202 are driven by the local PDU 212 of the corresponding drive device 208 via the interconnecting driveline 216. The driveline 216 comprises a mechanical drive including one or more movable (e.g., rotatable) members such as a rotary shaft (e.g., a flexible shaft and/or a torque tube) that are mechanically coupled via suitable known or other couplings (e.g., a universal joint) to form a common driveline for the PDU 212 of each drive device 208 for actuating (e.g., transferring power to) the associated high-lift surface 202. The driveline 216 transmits power from the PDU 212 of the respective drive device 208 to a location where it does work, e.g., the actuators 214A, 214B. The driveline 216 mechanically synchronizes the actuators 214A, 214B of an associated high-lift surface 202 to facilitate reducing asymmetric movement of the high-lift surface 202 and provide a mechanical fail-safe load path to permit actuation of the high-lift surface 202 if a failure or malfunction occurs in one of the actuators 214A, 214B. Further, the driveline 216 of each drive device 208 and thus of each high-lift surface 202 is separate from the driveline 216 of another drive device 208, which may facilitate savings with respect to installation space and weight. For example, the driveline 216 of an outboard high-lift surface 206A, 206B is separate from and independently movable in relation to the driveline 216 of an inboard high-lift surface 204A, 204B, and the respective drivelines 216 of the inboard high-lift surfaces 204A, 204B are separate and independently movable from one another.

The actuators 214A, 214B are mechanically coupled to the driveline 216 and convert a rotational movement of the driveline 216 into movement of the high-lift surface 202 coupled to the respective actuator 214A, 214B. The actuators 214A, 214B are respectively disposed on each side of an associated high-lift surface 202, e.g., a first or outboard actuator 214A is disposed on an outboard side and a second or inboard actuator 214B is disposed on an inboard side of each high-lift surface 202. The PDU 212 of each drive device 208 is interposed between an inboard and outboard actuator 214A, 214B coupled to the associated high-lift surface 202 to facilitate torque transfer via the driveline 216 to the actuators 214A, 214B. It will be appreciated that the actuators 214A, 214B may include additional components including, but not limited to, actuator track arrangement linkages, couplings, gears, sensors, etc., to transfer power from the driveline 216 to the high-lift surface 202 coupled thereto. The actuators 214A, 214B of each high-lift surface 202 are interconnected via a respective driveline 216 and thus mechanically synchronized by the respective driveline 216. The actuators 214A, 214B may each comprise a linear, rotary or other type of actuator. For example, actuators 214A, 214B may comprise screw/nut actuators (e.g., ball-screw or roller-screw), rack-and-pinion actuators and/or other suitable known or other type of actuators. Further, the actuators 214A, 214B may be reversible actuators such as the aforementioned ball-screw actuator, irreversible actuators such as lead or ACME screw actuators, or reversible actuators having a no-back mechanism. If the actuators 214A, 214B are reversible, the aerodynamic loads may be capable of back-driving the associated high-lift surface 202 whereas irreversible actuators cannot be back-driven by the aerodynamic load and are capable of holding the high-lift surface 202 in position even without power transmission from the driveline 216.

The independent drive devices 208 may further include at least one fail-safe brake 220 incorporated in the driveline 216 to brake the PDU 212, lock the actuators 214A, 214B, and/or hold the associated high-lift surface 202 at a desired position. The brake 220 may be functionally connected to and operated by the controller 210. Additionally, or alternatively, the controller 210 may also be configured to stop or brake the respective PDUs 212 by commanding zero speed or otherwise deactivating a motor of the PDU 212. The brakes 220 may comprise, for example, frictional power-off brakes to lock the mechanisms unless a power signal is applied, which also results in a locked PDU 212 upon complete power failure. Thus, the brakes 220 may be locked or closed by default and release (open) when the power supply is on, for example through a suitable command signal from the controller 210.

The controller 210 is able to provide power (e.g., electric power, hydraulic power, etc.) to each of the drive devices 208, control operation of the PDUs 212 and brakes 220, as well as monitor the operation of the drive devices 208 through one or more position sensors 218 associated with each drive device 208 and/or one or more skew sensors 222 driven by each high-lift surface 202. The controller 210 includes at least one control channel 224 functionally connected to the PDU 212, brake 220, and sensor(s) 218, 222 of each drive device 208 to control commands and power supply as well as receive feedback information. The controller 210 may receive power from a power source (e.g., a 28 volt DC power source) for generating control and command (e.g., activation) signals. The controller 210 may be a single-channel controller or multi-channel controller, and/or may comprise a plurality of controllers. For example, the controller 210 may comprise a single channel controller having a single control channel associated with a power supply that powers and commands all of the PDUs 212, brakes 220, and sensors 218, 222. As another example, the controller 210 may comprise a dual channel controller having two independent control channels and two power supplies that command and power individual PDUs 212, brakes 220, and sensors 218, 222, as discussed in more detail below. Each independent control channel may be associated with an independent power supply. For example, an independent control channel interfacing with a hydraulic motor may supply hydraulic fluid power from a hydraulic system of the aircraft via suitably controlling an electrically actuated valve. An independent control channel interfacing with an electric motor and/or an electric brake may be configured to supply power from an electrical power source (e.g., a 115 volt AC power source). Each independent control channel may be substantially isolated from one another so that a malfunction occurring in one channel does not affect the continued operation of the remaining control channel. For example, each control channel may use a separate processor. It will be appreciated that the number and configuration of controllers may vary. For example, two or a plurality of controllers may be employed in place of a single controller, wherein each controller includes at least one independent control channel.

The controller 210 may receive position signals from the position sensors 218 (e.g., resolvers, transducers, etc.) and/or the skew sensors 222 (e.g., a variable transformer) disposed on each high-lift surface 202. The position information provided by the position sensors 218 may be used by appropriate control routines of the controller 210 to position and/or move the high-lift surfaces 202, and may be further used by appropriate monitoring routines of the controller 210 to detect the current position of the high-lift surface 202 and transmits this position value to the controller 210. Based on the position signals received from the position sensors 218 and/or skew sensors 222, the controller 210 may adjust the motion of one or more high-lift surfaces 202 to, e.g., electronically synchronize the position and/or the movement of select high-lift surfaces 202, electronically coordinate controlled differential movement and/or different relative positions of select high-lift surfaces 202, and/or improve the continuity of the high-lift surfaces 202 on the same wing in the spanwise direction 116 when subjected to an aerodynamic load. The position information provided by the position sensors 218 and/or skew sensors 222 may also be used by the controller 210 to determine asymmetry of two or more high-lift surfaces 202 by transmitting a current rotational or displacement value of, e.g., the driveline 216 and/or the high-lift surface 202, to the controller 210, which value is a tolerance or identifies whether the ends of the driveline 216 (e.g., the ends joined to the respective actuators 214A, 214B) are rotated within a predetermined range. If the value exceeds the predetermined range, the controller 210 may adjust the motion of one high-lift surface 202 (e.g., outboard high-lift surface 206A) independently of another high-lift surface 202 (e.g., inboard high-lift surface 204A) to synchronize the position of the high-lift surfaces 204A and 206A. Additionally or alternatively, the controller 210 may command (e.g., deactivate) the respective fail-safe brake 220 to lock the associated high-lift surface 202 in place. The skew sensors 222 may provide information that is used by the controller 210 to detect possible twists or skew or other failure conditions in the respective high-lift surfaces 202. If the skew sensors 222 detect a failure condition, the controller 210 may control (e.g., deactivate) the respective fail-safe brake 220 to lock the associated high-lift surface 202 in place.

Figure 3A:
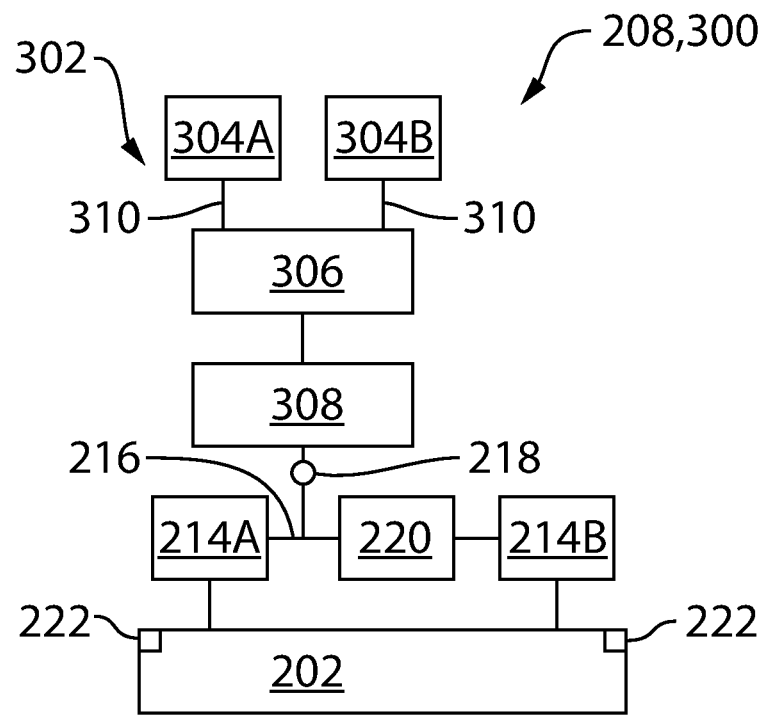
FIG. 3A illustrates a schematic diagram of an exemplary drive device part of the system of FIG. 2.

FIG. 3A illustrates a schematic diagram of an exemplary drive device 300 for actuating a corresponding high-lift surface 202 according to an exemplary configuration. The drive device 300 may be employed in the system 200 as one or more of the independent drive devices 208 for individually controlling a respective high-lift surface 202. The drive device 300 includes two actuators 214A, 214B arranged at an inboard side and an outboard side of the high-lift surface 202, respectively, a local dual motor PDU 302 and an interconnecting driveline 216. The PDU includes two motors 304A, 304B in a torque summing arrangement (e.g., a torque summing gear assembly) 306, and a reduction gear assembly 308. In a torque summing arrangement 306, the torques of each motor 304A, 304B are added while the motors are operating at the same speed. Accordingly, the output force of the motors 304A, 304B is combined and transmitted to the driveline 216. That is, the torque summing arrangement 306 adds (i.e., torque sums) the individual torques output by each motor 304A, 304B and transmits a combined torque to the driveline 216. A position sensor 218 (e.g., resolver), may be incorporated in the PDU 302, e.g., connected to a gear in the gearbox 308, arranged on the driveline 216, and/or arranged in a region of the actuators 214A, 214B. Further, skew sensors 222 may be driven by the high-lift surface 202 to detect failure conditions. The actuators 214A, 214B may comprise mechanical actuators each driven by the PDU 302 via the driveline 216. Additionally, the actuators 304A, 304B may comprise a linear or rotary actuator, and may be of the reversible or irreversible type. A fail-safe brake 220, e.g., a single dual channel brake, may be provided that is incorporated into the PDU 302 (not shown), e.g., connected to an output shaft of the PDU 302, and/or incorporated into the driveline 216 as shown and may be functionally connected to the controller 210 (not shown in FIG. 3A) and operated by command signals from the controller 210. The brake 220 may comprise, for example, a frictional power-off brake to lock the drive device 300 unless a power signal is applied, which also results in a locked PDU 302 and high-lift surface 202 upon complete power failure. Thus, the brake 220 may be locked by default and released (e.g., activated) when the power supply is on. The brake 220 may be electrically controlled and either electrically or hydraulically powered. Power-off brakes may be preferable over active control via the motors since the duty cycle for the high-lift function during flight is relatively short and the brake 220 provides additional safety in the event of faults or failures. Power-off brakes may be preferable over active control via the motors since the duty cycle for the high-lift function during flight is relatively short. The provision of a torque summing arrangement 306 may obviate the requirement for dedicated motor brakes due to the operational characteristics of the torque summing mechanism, as explained below. Pursuant to an implementation, a second fail-safe brake (not shown) may be provided to cater for brake failure and/or to provide back-up for an actuator no-back failure. For example, the second brake may be arranged on either of the motor outputs (e.g., upstream of the gearbox), or the driveline brake can be dualized.

The motors 304A, 304B may comprise an electric motor, a hydraulic motor, or a combination thereof. For example, the first motor 304A may comprise an electric motor and the second motor 304B may comprise a hydraulic motor. The motors 304A, 304B have a respective motor output 310 (e.g., an output shaft) whose torque is added together in the torque summing arrangement 306. Each motor 304A, 304B may provide full torque for system reliability in the case of a fault, for example if the first motor 304A fails (resulting in a 50% loss of output torque) the combined torque output from the torque summing arrangement 306 will correspond to the full torque produced by the operational second motor 304B. In contrast, with a speed sum arrangement comprising two motors connected to a differential gearbox the speed of each motor may be halved to get the desired power, but the speed sum arrangement cannot provide more torque output than what would be delivered by a single motor. Thus, failure of one motor in a speed summing arrangement will result in a 50% loss of output velocity. Further, with actuators 214A, 214B capable of stopping and starting at any position, for example to move the high-lift surfaces 202 into and out of variable camber, differential position, and roll trim, full torque is required at all speeds and the motors 304A, 304B here produce full torque at all rotor positions to facilitate reliable operation in instances of a fault or failure event. The motors 304A, 304B may have different capability ratings, e.g., the second motor 304B may provide an output speed slower than that of the first motor 304A through a different gear ratio but have a full torque capability. As such, the output of the respective local PDU may be slower when, for example, the second motor 304B drives as compared to the first motor 304A. The motors 304A, 304B may respectively interface with at least one independent control channel (not shown) and at least one power source (not shown), as described further below. The motors 304A, 304B may be on the same shaft or may have gearing connecting them. Additionally or alternatively, the motors may be of the parallel shaft configuration (e.g., the respective motor outputs extend parallel to the driveline) or a right-angle configuration.

Figure 3B:
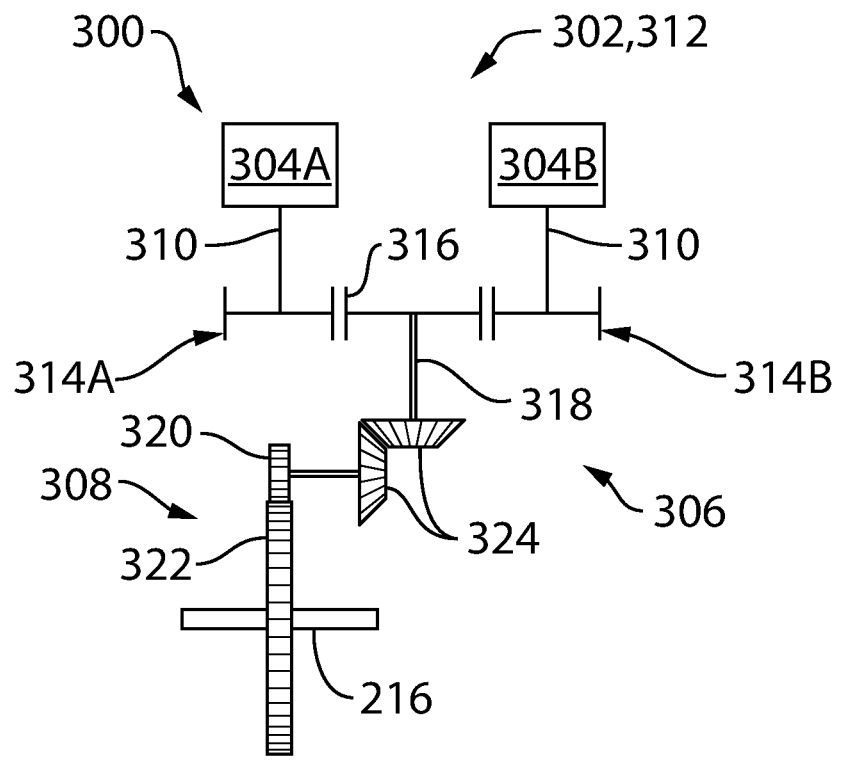
FIG. 3B illustrates a detailed schematic representation of the drive device of FIG. 3A according to an example.

FIG. 3B shows a schematic representation of an exemplary drive device 300 of FIG. 3A showing an example of a first configuration 312 of the local PDU 302 comprising motors 304A, 304B in a torque summing arrangement 306 having an exemplary right-angle configuration connected via gearing. It will be appreciated that the right-angle configuration is exemplary only and that other configurations, such as a parallel configuration, is contemplated with the scope of the disclosure. The motors 304A, 304B may both operate simultaneously or one motor 304A, 304B may operate while the other motor 304A, 304B is back-driven, and the gear ratio between the motors 304A, 304B may be equal or different. The torque summing arrangement 306 may include two driving gears 314A each rotationally connected to the respective motor outputs 310 and a driven gear 316 mechanically coupled with the two driving gears 314B. The respective gears 314A, 314B, 316 may include helical, bevel, spur, or combinations thereof, or other suitable gear systems such as a planetary gear. The torques of each motor 304A, 304B are transmitted via the respective driving gears 314A, 314B to the driven gear 316, which combines or adds the torque of each motor 304A, 304B such that the torque output by the driven gear 316 and thus the torque summing arrangement 306 is the sum of the two motor torques, that is, a combined torque. When both motors 304A, 304B are operating at the same time, the output torque of the driven gear 316 is the sum of the applied torques at the driving gears 314A, 314B. In the event that one of the motors fails, for example the first motor 304A fails due to a malfunction, then the driving gear 314B of the operational second motor 304B drives the driven gear 316 and the driving gear 314A of the failed first motor 304A is freewheeling. As such, the provision of motor brakes, which may be required for differential gearbox arrangements or speed summing arrangements in the event that one motor fails to fix the output or gear of the failed motor and prevent the operational motor from back driving the failed motor (which would in effect stop the motion of the differential output), can be dispensed with entirely to facilitate further savings with respect to expenditure, complexity and weight.

The reduction gearbox 308 may comprise a speed reduction gearbox (e.g., transmission of high speed/low torque to low speed/high torque) such as a planetary gear assembly or a simple reduction gear assembly including at least two gears 320, 322 operably connecting the output 318 of the torque summing arrangement to the driveline 216. For example, an input gear 320 (e.g., a pinion) may be fixed or mechanically coupled (e.g., rotationally connected) to the output 318 of the torque summing arrangement 306 and mesh with an output gear 322 (e.g., a gear wheel) fixed or mechanically coupled (e.g., rotationally connected) to the driveline 216, wherein the output gear 322 rotates more slowly than the input gear 320 to provide for speed reduction. Further reduction and/or idler gears 324 may be incorporated into the gearbox arrangement 308 between the input gear 320 and the output gear 322, and/or between the output 318 of the torque summing arrangement and the input gear 320. The respective gears 320, 322, 324 may include spur, bevel, helical, worm, or other suitable gear types, including combinations thereof. It will be appreciated that the gearbox 308 may comprise a belt train rather than a gear train without departing from the scope of the disclosure.

Figure 3C:
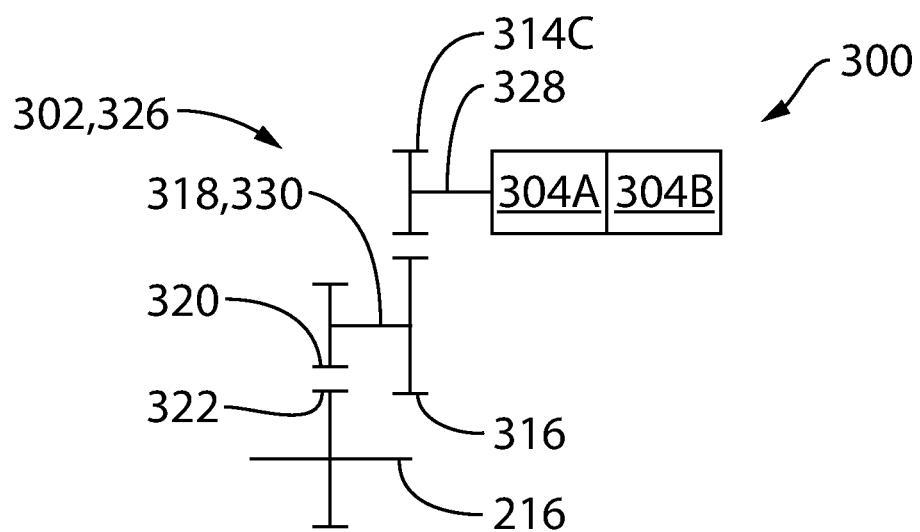
FIG. 3C illustrates a detailed schematic representation of the drive device of FIG. 3A according to another example.

With brief reference to FIG. 3C, another exemplary drive device 300 of FIG. 3A is shown pursuant to an example of a second configuration 326 of the local PDU 302 comprising two motors 304A, 304B arranged in a torque summing arrangement 306 on a shared shaft or a shared output shaft (hereafter "shared shaft 328") in a parallel configuration with respect to the driveline 216. At least one driving gear 314C meshes with at least one driven gear 316 coupled to an intermediate shaft 330 forming the output 318 of the toque summing arrangement 306. The input gear 320 may be rotationally connected to the intermediate shaft 330 and the output gear 322 may be rotationally connected to the driveline 216, wherein the output gear 322 rotates more slowly than the input gear 320 to provide for speed reduction.

Figure 4A:
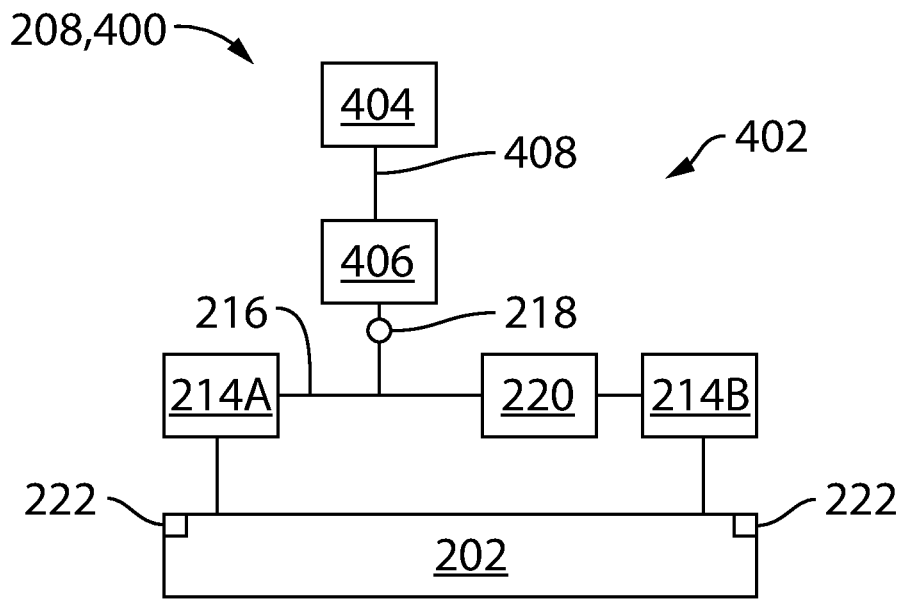
FIG. 4A illustrate a schematic diagram of another exemplary drive device part of the system of FIG. 2.
Figure 4B:
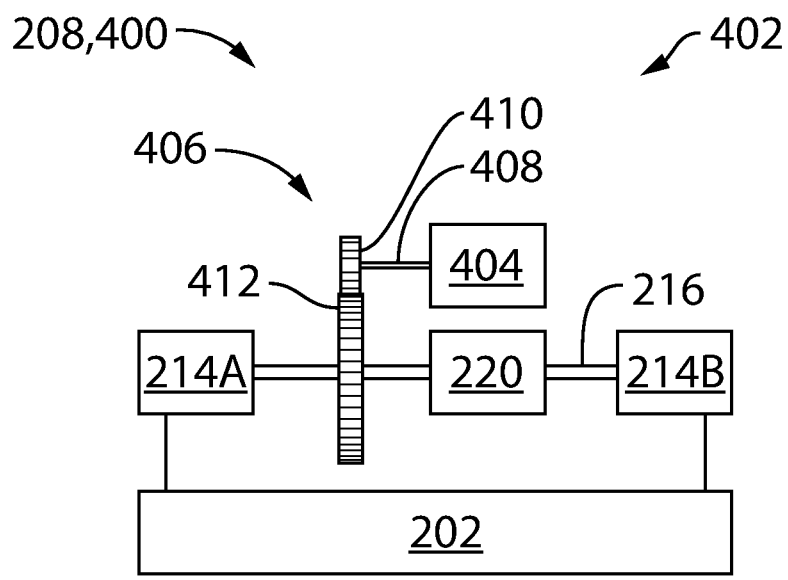
FIG. 4B illustrates a detailed schematic representation of the drive device of FIG. 4A according to an example.

Referring to FIGS. 4A and 4B, a schematic representation of an exemplary drive device 400 for actuating a corresponding high-lift surface 202 according to another exemplary configuration is shown. The drive device 400 may be employed in the system 200 as one or more of the independent drive devices 208 for individually controlling a respective high-lift surface 202. The drive device 400 includes two actuators 214A, 214B arranged at an inboard side and an outboard side of the high-lift surface 202, respectively, a local PDU 402 arranged between (e.g., centrally) the two actuators 214A, 214B, and an interconnecting driveline 216. The PDU 402 includes a single motor 404 and a gearbox or gear assembly 406 mechanically connecting the motor output 408 (e.g., an output shaft) to the driveline 216. The motor 404 may comprise an electric motor or a hydraulic motor, and the motor 404 may interface with at least one independent control channel (not shown) and at least one power source (not shown). The gearbox 406 may comprise a speed reduction gearbox (e.g., transmission of high speed/low torque to low speed/high torque) such as a planetary gearbox or a simple reduction gear assembly including an input gear 410 (e.g., a pinion) fixed to the motor output 408 that is mechanically coupled with an output gear 412 (e.g., a gear wheel) fixed to the driveline 216. The gearbox 406 may deliver full torque and equal speed on either side of the output gear 412 to the driveline 216. The respective gears 410, 412 may rotate about a fixed axis, and may include spur, bevel, helical, worm, or other suitable gear types including parallel shaft and right-angle gearboxes. Further reduction and/or idler gears (not shown) may be incorporated into the gearbox 406 arrangement for additional speed reductions. It will be appreciated that the gearbox 406 may comprise a belt train rather than a gear train without departing from the scope of the disclosure.

A position sensor 218 (e.g., resolver) may be incorporated in the PDU 402, e.g., connected to a gear in the gearbox 406, arranged on the driveline 216, and/or arranged in a region of the actuators 214A, 214B. Further, skew sensors 222 may be driven by the high-lift surface 202 to detect failure conditions. The actuators 214A, 214B may comprise a linear or rotary actuator, and may be of the reversible or irreversible type. A fail-safe brake 220, e.g., a frictional power-off brake, is incorporated into the driveline and may be functionally connected to the controller 210 (not shown) and operated by command signals from the controller 210. The brake 220 may be a single channel or dual channel brake, as explained further below. An optional second fail-safe brake (not shown) may be provided to cater for brake failure and/or provide back-up for an actuator no-back failure. The second brake can be incorporated into the PDU 402 as a motor brake (e.g., the brake may be arranged at the motor output 408 upstream of the gearbox 406), or the driveline brake 220 can be dualized (e.g., a dual-wound friction brake).

FIG. 5 is a schematic representation of the high-lift system 200 of FIG. 2 showing a dual channel control structure 500 for independently actuating a plurality of high-lift surfaces 202 according to one exemplary implementation. The controller 210 may be, for example, a multi-channel controller having at least two independent control channels 502, 504 separately operable to control and power the PDU 212 of each drive device 208. In the illustrated example, the controller 210 is dualized or partitioned into a dual channel controller 210 having two independent control channels 502, 504 interfacing with each PDU 212, brake 220, and sensor 218, 222 associated with each high-lift surface 202. For clarity the control channels coupled to the brakes 220 and sensors 218, 222 have been omitted from the illustration. Position sensors 218 and skew sensors 222 provide feedback to each control channel 502, 504 of the controller 210, and thus each sensor 218, 222 (e.g., dual channel sensor) interfaces with both independent control channels 502, 504. Controller 210 shares the position and skew feedback signals of the channels 502, 504 for comparison and fault monitoring, for example via a cross channel data link 506. The actuators 214A, 214B may be irreversible mechanical actuators having an integrated no-back function. The provision of irreversible actuators 214A, 214B may advantageously prevent asymmetries between left and right wings 104A, 104B and hold the associated high-lift surface 202 in the commanded position following power shutoff without the use of additional no-back brakes since these requirements are intrinsically accomplished due to the irreversible configuration. The respective PDUs 212 of the independent drive devices 208 are selectively operable to actuate the outboard high-lift surfaces 206A, 206B independently of each other and independently of the inboard high-lift surfaces 204A, 204B, for example in response to appropriate command or control signals from the controller 210.

Pursuant to a first implementation, the dual channel control structure 500 of the system 200 employs a drive device 300 described in connection with FIGS. 3A-3C. With reference to FIGS. 3A-3C and 5, the plurality of drive devices 300 respectively comprise a dual motor PDU 302 (e.g., two motors 304A, 304B in a torque summing arrangement 306 and a reduction gearbox 308), two mechanical actuators 214A, 214B, and an interconnecting driveline 216. The dual channel controller 210 powers and commands individual PDU motors 304A, 304B, brakes 220 and sensors 218, 222 such that each drive device 300 interfaces with two independent control channels 502, 504. For example, a first independent control channel 502 using a first power source controls and supplies power to the first motor 304A of each PDU 302, and a second independent control channel 504 using a second power source controls and supplies power to the second motor 304B of each PDU 302. The sensors 218, 222 are dual channel and interface with the two independent control channels 502, 504. The fail-safe brake 220, for example a power-off brake, is incorporated into the driveline 216 and can be released or opened (e.g., activated) by any of the two independent control channels 502, 504. The brake 220 holds the associated high-lift surface 202 at a desired position and stops the output of the PDU 302. Power may be removed during an emergency shutdown and also when the desired position is reached so that the motors 304A, 304B need not be energized when the high-lift surface 202 is stationary. An optional second fail-safe brake (not shown) may be employed to provide back-up for an actuator no-back failure and/or failure of the brake 220. The optional second brake may be made smaller and/or have a torque rating less than the first fail-safe brake 220, which may perform the primary braking function for the associated high-lift surface 202 during normal operation, if the actuators 214A, 214B are irreversible actuators or otherwise have an integrated no-back function. If the actuators 214A, 214B are reversible, the provision of the second brake may be required with a torque rating that is the same as the first fail-safe brake for reliability and redundancy.

Pursuant to a second implementation, the dual channel control structure 500 of the system 200 employs a drive device 400 described in connection with FIGS. 4A-4B. With reference to FIGS. 4A-5, the plurality of drive devices 400 respectively comprise a single motor PDU 402 (including a motor 404, position sensor 218 and reduction gearbox 406), two actuators 214A, 214B and an interconnecting driveline 216. The motor 404 of each drive device 400 interfaces with the two independent control channels 502, 504 with two power sources or supplies and may be controlled and powered by either one. For example, the motor 404 of each drive device 400 may be controlled and powered by the first independent control channel 502 using the first power source, and separately controlled and powered by the second independent control channel 504 using the second power source. Thus, if one channel 502 or 504 fails, the operable channel 502 or 504 can operate the entire system 200 to provide redundancy and reliability. The brakes 220 and sensors 218, 222 are of the dual channel type and interface with the two independent control channels 502, 504 as explained above.

Figure 6:
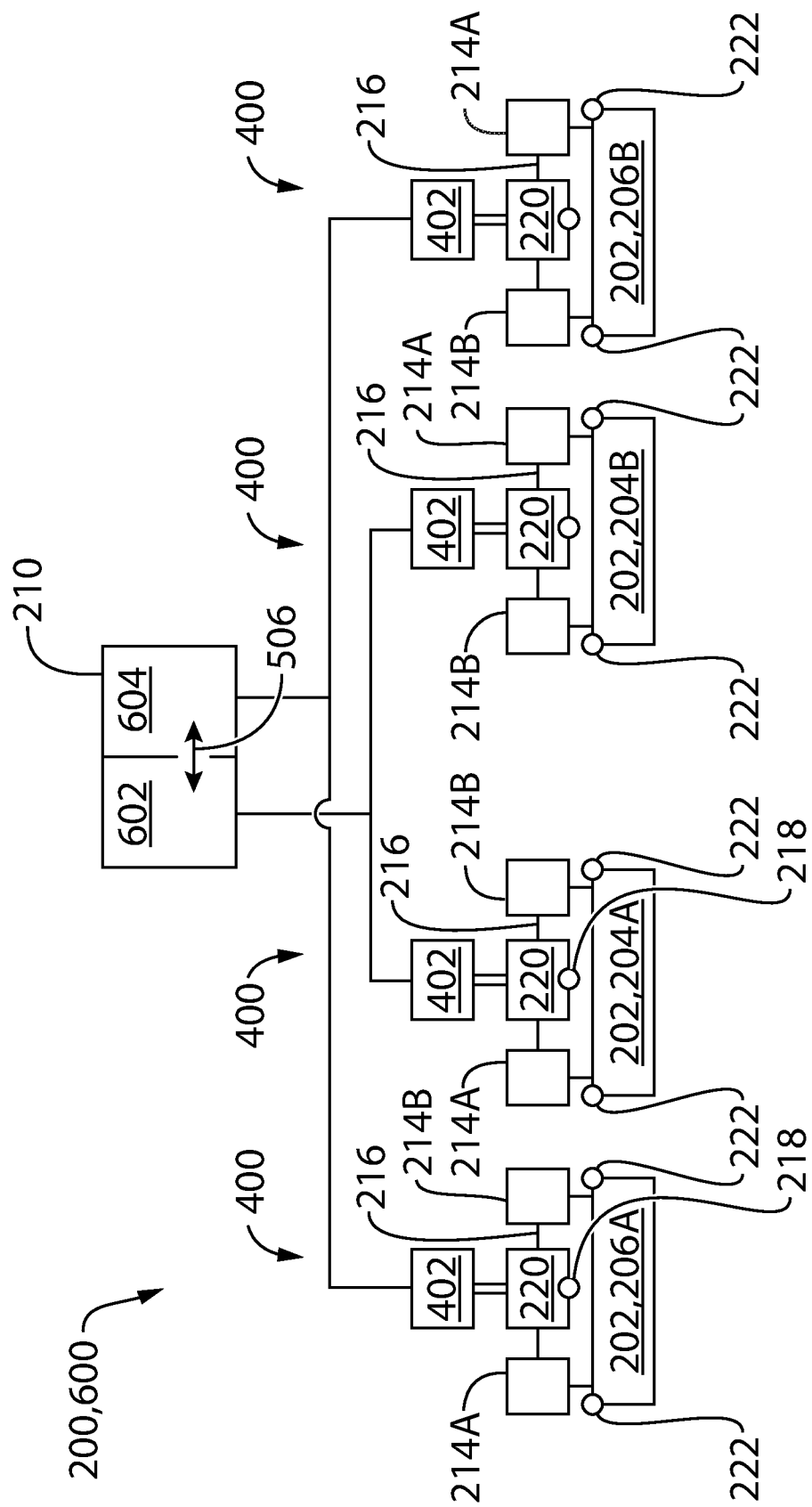
FIG. 6 illustrates the high-lift actuation system of FIG. 2 according to another implementation.

FIG. 6 is a schematic representation of the high-lift system of FIG. 2 showing a dual channel control structure 600 for independently actuating a plurality of high-lift surfaces 202 according to another exemplary implementation. The dual channel control structure 600 of the system 200 may employ a drive device 400 described in connection with FIGS. 4A-4B. With reference to FIGS. 4A-4B and 6, the plurality of drive devices 400 respectively comprise a local PDU 402 including a single motor 404, position sensor 218 and reduction gearbox 406, two mechanical actuators 214A, 214B (e.g., irreversible actuators), an interconnecting driveline 216, a fail-safe brake 220, and skew sensors 222. The controller 210 may be dualized or partitioned into a dual channel controller 210 having a first control channel 602 and an associated first power source that controls and powers the drive devices 400 of the inboard high-lift surfaces 204A and 204B, and a second control channel 604 and an associated second power source that controls and powers the drive devices 400 of the outboard high-lift surfaces 206A and 206B. The fail-safe brakes 220 respectively interface with and are commanded (e.g., activated or deactivated) by the control channel 602, 604 dedicated to the associated drive device (e.g., the fail-safe brake 220 associated with the drive device 400 for actuating the inboard high-lift surface 204A or 204B can be activated by the first control channel 602). Similarly, the position and skew sensors 218 and 222 communicate with the controller 210 via the control channel 602, 604 dedicated to the associated drive device 400 and thus comprise a single channel sensor. For clarity the control channels 602, 604 coupled to the brakes 220 and sensors 218, 222 have been omitted from the illustration.

Pursuant to a further implementation, the system 200 of FIG. 2 can be configured as a single channel system where a single channel controller 210 having a single control channel 224 controls and powers all drive devices 208 using a single power source. The drive device 400 described in connection with FIGS. 4A-4B may be employed for this configuration. The components of each drive device 400 are each single channel and interface with the single control channel 224 of the controller 210.

During operation, the controller 210 controls and directs power to the individual drive devices 208, 300, 400 to selectively actuate the plurality of high-lift surfaces 202, for example based on an input (e.g., electrical signals indicative of a movement command) from a pilot, a flight controls controller, or any other controller of the aircraft based on flight conditions. The controller 210 may be configured to convert the input into movement of the high-lift surfaces 202 by comparing the input to the information provided by the position sensors 218 and/or skew sensors 222, and generate one or more control signals to activate and deactivate the PDU 212 motor(s) and brakes. The controller 210 can send commands to each PDU 212 (e.g., motor, brake, etc.) to operate at a prescribed velocity and direction to extend or retract the high-lift surfaces 202. Power from the PDU 212 is transmitted to the interconnecting driveline 216 that mechanically synchronizes the movement of the inboard and outboard actuators 214A, 214B of a respective high-lift surface 202. The controller 210 is operatively (e.g., electrically) connected to the position sensor(s) 218 of each PDU 212 and skew sensors 222 driven by each high-lift surface 202. Position feedback for closed-loop position control may be provided by the sensors 218, 222 such that the controller 210 can, based on feedback from the sensors 218, 222, electronically control operation of the PDUs 212 (e.g., the motor(s)) and brakes 220 to electrically synchronize and coordinate the movements and positions of the high-lift surfaces 202. The controller 210 can further, based on the feedback from the sensors 218, 222, monitor for asymmetry, skew, and/or unintentional movement of the high-lift surfaces 202. Control signals may be generated by controller 210 based on one or more set points (e.g., that may represent one or more desired speeds and/or positions of an associated high-lift surface 202) and one or more feedback signals (e.g., that may represent one or more actual speeds and/or positions of the associated high-lift surface 202 as determined by the position sensors 218 and/or skew sensors 222). Controller 210 may receive the set point and feedback and generate one or more error signals for the generation of control signal. Controller 210 may operate according to known or other suitable control algorithms. In various aspects, the controller 210 may be configured to conduct one or more of proportional, derivative and integral control.

To control the high-lift function, the controller 210 is configured to selectively power and control the plurality of drive devices 208 (e.g., the respective PDUs 212 and brakes 220) to electronically coordinate actuation of the plurality of high-lift surfaces 202. The controller 210 may be configured to electronically synchronize movements and positions of the high-lift surfaces 202, and to electronically control differential movements and positions of the high-lift surfaces 202. Synchronized motion and controlled differential motion between the high-lift surfaces 202 is performed electronically based on feedback from the position sensor(s) 218 of the respective drive devices 208. For example, the controller 210 may be configured to electronically synchronize symmetrical motion of all of the high-lift surfaces 202, symmetrical motion of the inboard high-lift surfaces 204A, 204B only (e.g., independently of the outboard high-lift surfaces 206A, 206B), and/or symmetrical motion of the outboard high-lift surfaces 206A, 206B only (e.g., independently of the inboard high-lift surfaces 204A, 204B). Additionally or alternatively, the controller 210 may be configured to electronically coordinate controlled differential motion of the outboard high-lift surfaces 206A and 206B (e.g., non-symmetric motion).

To symmetrically move the high-lift surfaces 202 simultaneously in unison, the respective brakes 220 of each drive device 208 are released (e.g., activated) and the respective PDUs 212 of each drive device 208 are operated (e.g., powered) and electrically synchronized to provide symmetrical motion of the inboard and outboard high-lift surfaces 204A, 204B and 206A, 206B. To operate the respective PDUs 212, the associated motor(s) thereof may be activated, powered, or otherwise commanded to drive or mechanically move the driveline 216, which in turn moves the actuators 214A, 214B with a corresponding movement of the high-lift surface 202 coupled to the actuators 214A, 214B.

To symmetrically move the inboard high-lift surfaces 204A and 204B independently of the outboard high-lift surfaces 206A and 206B (e.g., for variable camber), the respective brakes 220 of the inboard drive devices 208 (e.g., the drive devices 208 for each inboard high-lift surface 204A, 204B) are released (e.g., activated) and the respective PDUs 212 of the inboard drive devices 208 are operated (e.g., powered) and synchronized electronically to provide symmetrical motion of the inboard high-lift surfaces 204A, 204B. The respective brakes 220 of the outboard drive devices 208 (e.g., the drive devices 208 for each outboard high-lift surface 206A, 206B) are engaged (e.g., deactivated) or otherwise closed to lock the outboard high-lift surfaces 206A, 206B in position.

To symmetrically move the outboard high-lift surfaces 206A and 206B independently of the inboard high-lift surfaces 204A and 204B (e.g., for variable camber), the respective PDUs 212 of the outboard drive devices 208 (e.g., the drive devices 208 for each outboard high-lift surface 206A, 206B) are operated (e.g., powered) and synchronized electronically to provide symmetric motion between the outboard high-lift surfaces 206A and 206B. The respective brakes 220 of the outboard drive devices 208 are released (e.g., activated), and the respective brakes 220 of the inboard drive devices 208 (e.g., the drive devices 208 for each inboard high-lift surface 204A, 204B) are engaged (e.g., deactivated) to lock the inboard high-lift surfaces 204A, 204B.

To differentially move the outboard high-lift surfaces 206A and 206B independently of the inboard high-lift surfaces 204A and 204B (e.g., for roll trim), the respective PDUs 212 of the outboard drive devices 208 (e.g., the drive devices 208 for each outboard high-lift surface 206A, 206B) are operated and controlled electronically to provide controlled differential (non-symmetrical) motion between outboard high-lift surfaces 206A and 206B. The respective brakes 220 of the outboard drive devices 208 are released (e.g., activated), and the respective brakes 220 of the inboard drive devices 208 (e.g., the drive devices 208 for each inboard high-lift surface 204A, 204B) are engaged (e.g., deactivated) to lock the inboard high-lift surfaces 204A, 204B.

Additionally or alternatively, the controller 210 may be configured to electronically control differential motion between an inboard high-lift surface, 204A, 204B and an outboard high-lift surface 206A, 206B of a respective wing 104A, 104B, and/or to electronically coordinate symmetric or asymmetric motion between outboard high-lift surfaces 206A and 206B. For example, to differentially move the outboard high-lift surface 206A and the inboard high-lift surface 204A of the first wing 104A, the respective PDUs 212 of the drive devices 208 for the respective high-lift surfaces 204A and 206A are operated (e.g., powered) and controlled electronically to provide controlled differential (non-symmetrical) motion between the outboard and inboard high-lift surfaces 204A and 206A with the associated brake 220 released (e.g., activated). Further, the controller 210 may be configured to move one or more high-lift surfaces 202 by different amounts and/or at different movement rates than one or more other high-lift surfaces 202.

It will be appreciated that the controller 210 may be configured to actuate the high-lift surfaces 202 to provide other types of motion without departing the scope of the disclosure. For example, the controller 210 may be configured to move one or more pairs of high-lift surfaces 202 (e.g., a pair of inboard high-lift surfaces 204A, 204B and/or a pair of outboard high-lift surfaces 206A, 206B) separately or simultaneously by any combination of motions described above.

Figure 7:
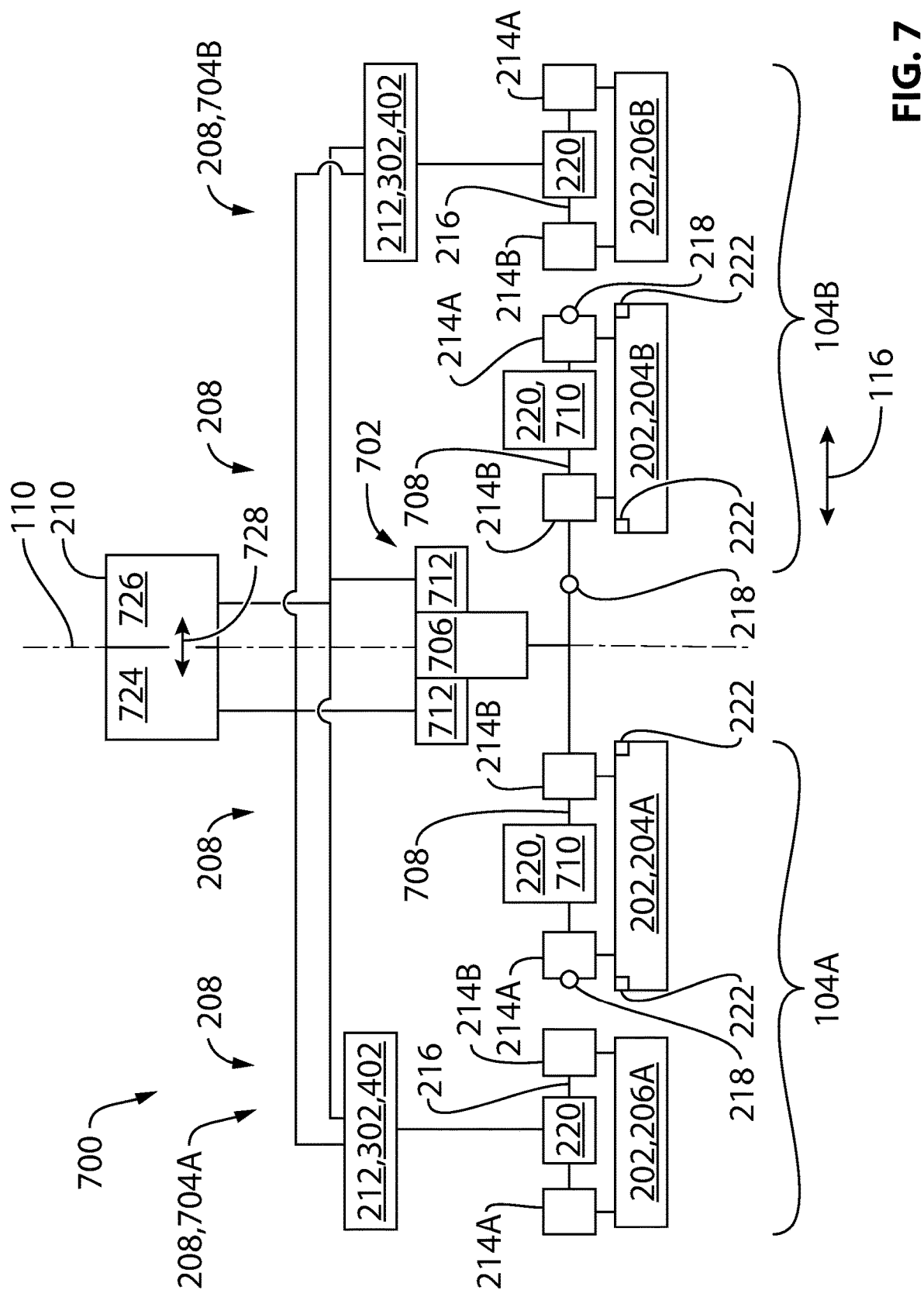
FIG. 7 illustrates a schematic representation of another exemplary high-lift actuation system for differentially actuating a plurality of high-lift surfaces of the aircraft of FIG. 1.

FIG. 7 illustrates a schematic representation of another exemplary high-lift actuation system 700 for differentially actuating a plurality of high-lift surfaces 202 of the aircraft 100 of FIG. 1. The system 700 may include like or corresponding components of the system 200 explained above as represented by like reference numbers and characters, the description of which is applicable to the following discussion.

The system 700 includes a central drive device 702 for centralized actuation control of the inboard high-lift surfaces 204A, 204B, at least two independent drive devices 208 for individualized actuation control of the outboard high-lift surfaces 206A, 206B, and a controller 210 operatively connected to the components of the drive devices 208, 702. The system 700 may operate to actuate the outboard high-lift surfaces 206A and 206B independently of one another and independently of the inboard high-lift surfaces 204A and 204B without mechanical interaction between the inboard high-lift surface 204A, 204B and the outboard high-lift surface 206A, 206B of a respective wing 104A, 104B. The controller 210 may electronically coordinate the movements and positions of the high-lifts surfaces 202, for example to move the high-lift surfaces 202 into synchronized positions and/or different relative positions.

The independent drive devices 208 include a first outboard drive device or a first local drive device (hereafter "first outboard drive device 704A") including a first local PDU 212 disposed on the first wing 104A remote from a central longitudinal axis 110 of the aircraft 100 (see FIG. 1) operably coupled to a first outboard driveline or a first local driveline (hereafter "first outboard driveline 216") for driving the first outboard (e.g., local) high-lift surface 206A on the first wing 104A, and a second outboard drive device or a second local drive device (hereafter "second outboard drive device 704B") including a second local PDU disposed on the second wing 104B remote from the central longitudinal axis 110 operably coupled to a second outboard driveline or a second local driveline (hereafter "second outboard driveline 216") for driving the second outboard (e.g., local) high-lift surface 206B on the second wing 104B. The local PDUs 212 of the first and second outboard drive devices 704A, 704B may be arranged centrally relative to the outboard high-lift surface 206A, 206B between at least two first mechanical actuators 214A, 214B and at least two second mechanical actuators 214A, 214B, respectively. The first and second local PDU 212 may include at least one motor mechanically coupled via a speed reduction gear assembly to the respective driveline 216. The independent drive devices 704A, 704B may employ the local PDU 302 described in connection with FIGS. 3A-3C, the local PDU 402 described in connection with FIGS. 4A-4B, or a combination thereof, including the structure and arrangement of actuators, brakes, sensors, and control channel allocations (as described in reference to FIGS. 5-6). For example, the first outboard drive device 704A may include a first local PDU 302 comprising two motors 304A, 304B in a torque summing arrangement 306 with a reduction gear assembly 308 (see FIGS. 3A-3C), and the second outboard drive device 704B may include a second local PDU 402 comprising a single motor 404 with a reduction gear assembly 406 (see FIGS. 4A-4B), or vice versa. Further, the first and second outboard drive devices 704A, 704B may both include the local PDU 302 comprising two motors 304A, 304B in a torque summing arrangement 306, and may have the same configuration (e.g., the respective PDUs 302 both comprise the first configuration 312 or the second configuration 326) or separate configurations (e.g., the PDU 302 of drive device 704A comprises the first configuration 312 and the PDU 302 of drive device 704B comprises the second configuration 326, or vice versa). Alternatively, the first and second outboard drive devices 704A, 704B may both comprise the PDU 402 and associated components of the drive device 400 of FIGS. 4A-4B. The first and second outboard drive devices 704A, 704B are separate and independent of the central drive device 702.

The central drive device 702 includes a central power drive unit (PDU) 706 operably coupled to a common central driveline 708 for driving a first high-lift surface or a first inboard high-lift surface 204A on the first wing 104A and a second high-lift surface or a second inboard high-lift surface 204B on the second wing 104B. The central PDU 706 is disposed between the first wing 104A and the second wing 104B, for example in the fuselage 102 of the aircraft 100 show in FIG. 1 (e.g., in a region of the central longitudinal axis 110). The central PDU 706 is mechanically coupled to the common central driveline 708, and may comprise a suitably controlled electrical or hydraulic motor of a single or double motor type arrangement (including a combination of an electrical motor and a hydraulic motor) and a gear assembly. The common central driveline 708 extends in a spanwise direction 116 through the fuselage 102 of the aircraft 100 (e.g., through the central longitudinal axis 110) and connects the central PDU 706 to a plurality of mechanical actuators 214A, 214B (e.g., an outboard actuator 214A and an inboard actuator 214B per high-lift surface 204A, 204B). It will be appreciated that two or more actuators 214A, 214B may be provided per high-lift surface 204A, 204B. The common central driveline 708 comprises one or more rotary or movable (e.g., rotatable) mechanical members, for example one or more shaft sections (e.g., torque tubes or flexible shafts), mechanical couplings (e.g., universal joint), bearings, angular gear arrangements, etc. to form a common driveline for actuating (e.g., transferring power to) the inboard high-lift surfaces 204A and 204B. Further, the common central driveline 708 is separate and spaced apart in the spanwise direction 116 from the first outboard driveline 216 of the first outboard drive device 704A and the second outboard driveline 216 of the second outboard drive device 704B without mechanical interaction to facilitate increased flexibility for differentially actuating the high-lift surfaces 202.

Position sensors 218 (e.g., resolvers) may be provided at different spanwise locations on the common central driveline 708 or connected to the common central driveline 708 to measure or detect a position of the inboard high-lift surfaces 204A, 204B. The position sensors 218 may, for example, be arranged at each outboard end (e.g., at the outboard actuator 214A of each inboard high-lift surface 204A and 204B, respectively) and/or a central region of the common central driveline 708 (e.g., in the fuselage 102). Further sensors, such as skew sensors 222, may be disposed on the inboard high-lift surfaces 204A and 204B for detecting failure conditions. Additionally or alternatively, the central PDU 706 may incorporate one or more integrated sensors (not shown) to detect the rotational position and/or speed of the motor(s).

The central PDU 706 exerts a rotational motion and drive power to the common central driveline 708, which in turn transmits the power to the actuators 214A, 214B for moving the inboard high-lift surfaces 204A and 204B. Since the common central driveline 708 is separate from the respective outboard drivelines 216 (e.g., without mechanical interaction), the central PDU 706 needs to cope with a significantly lower mechanical load and thus produce a smaller drive power than a conventional central drive unit of a shared shaft system, with the result that the central PDU 706 may be made smaller to facilitate overall weight and installation savings. Through the use of the common central driveline 708, the central PDU 706 may be configured to mechanically synchronize movement of the first inboard high-lift surface 204A and the second inboard high-lift surface 204B, and thereby limit or reduce asymmetry between first and second wings 104A and 104B.

To account for driveline failures and aircraft safety, at least two asymmetry brakes 710, for example fail-safe brakes 220, may be provided and arranged at opposite sides of the common central driveline 708 with respect to the central longitudinal axis 110. For example, a brake 710 (e.g., a power-off frictional brake) may be incorporated on the common central driveline 708 on each wing side of the central drive device 702 (e.g., outboard of the respective wing root 106 shown in FIG. 1), and may be arranged outboard of at least one of the inboard 214B and outboard actuator 214A of the respective inboard high-lift surface 204A, 204B in the spanwise direction 116 (e.g., arranged between the inboard 214B and outboard actuator 214A, or outboard of the outboard actuator 214A, of each high-lift surface 204A, 204B). Pursuant to an implementation, a single brake 710 may be installed on the common central driveline 708 between the inboard 214B and outboard actuator 214A of the first inboard high-lift surface 204A and the second inboard high-lift surface 204B, respectively. If the actuators 214A, 214B are implemented as irreversible actuators having an integrated no-back function, the fail-safe brakes 710 may be omitted or reduced in size to provide back-up for an actuator no-back failure, and thus reduce weight and installation expenditures.

Figure 8:
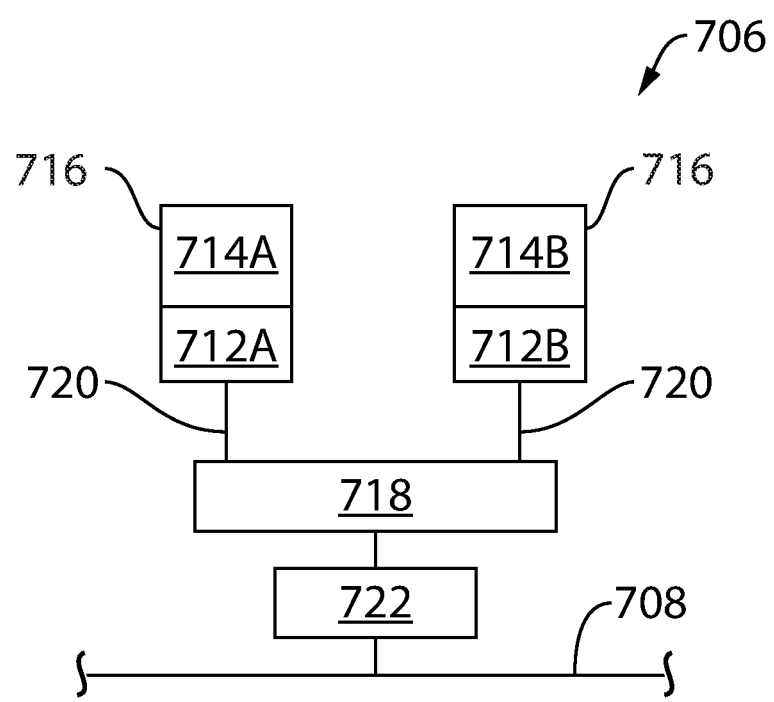
FIG. 8 illustrates a schematic diagram of an exemplary drive device part of the system of FIG. 7.

With reference to FIGS. 7 and 8, the central PDU 706 may comprise two motor brake assemblies 716, e.g., a first motor 714A with a first brake 712A and a second motor 714B with a second brake 712B, coupled to a speed sum gear assembly 718. The two motors 714A, 714B may be independently operable motors whose speed can be regulated. With speed summing, the output speed of each motor 714A, 714B can be halved to produce a desired horse power, enabling the use of smaller and/or lighter motors as compared to two motors each providing full speed. The two motors 714A, 714B may be engaged via a respective motor output 720 to the speed summing gear assembly 718 (e.g., a differential gearbox) that couples the respective motor outputs 720 in a speed summing manner. That is, the speed summing gear assembly 718 may be configured to receive and sum the output speeds of the two motors 714A, 714B. In some implementations, the two motors 714A, 714B may operate simultaneously to drive the inboard high-lift surfaces 204A, 204B, in which case the speed summing gear assembly 718 delivers a summed output that adds (sums) the individual output speeds of the two motors 714A, 714B together. In other implementations, only one of the first motor 714A and the second motor 714B may operate at a given time to drive the inboard high-lift surfaces 204A, 204B. If only one of the two motors 714A, 714B is driving, the speed summing gear assembly 718 delivers a reduced summed output speed. The speed summing gear assembly 718 delivers the summed output to, and is coupled with, a speed reduction gear assembly 722 rotationally connected to the common central driveline 708. The speed reduction gear assembly 722, such as the type of gearbox 308, 406 described above, is mechanically coupled between the speed summing gear assembly 718 and the common central driveline 708.

The first motor 714A and the second motor 714B may each comprise an electric motor or a hydraulic motor, or a combination thereof. For example, the first motor 714A may comprise a hydraulic motor and the second motor 714B may comprise an electric motor. The first brake 712A and the second brake 712B may be coupled to the respective motor outputs 720 of the first motor 714A and the second motor 714B (e.g., upstream of the speed summing gear assembly 718), and may be configured as a power-off brake for preventing rotation of the respective motor output 720. The first motor 714A and the second motor 714B may both operate simultaneously to drive the inboard high-lift surfaces 204A, 204B.

Additionally or alternatively, the first motor 714A and the second motor 714B may have separate dedicated functions and may be operated at different times depending on flight conditions. The first motor 714A may operate as a primary motor and the second motor 714B may operate as a secondary and/or back-up motor. The first motor 714A can provide power to the inboard high-lift surfaces 204A, 204B during normal operations, and the second motor 714B can provide power to the high-lift surfaces 204A, 204B as back-up in the event the first motor 714A is unable to do so. The first motor 714A may have a capability rating that is different from that of the second motor 714B. For example, the first motor 714A may have a horsepower that is greater than that of the second motor 714B, and/or the second motor 714B may operate at a speed less than that of the first motor 714A. The provision of different capability ratings permits the second motor 714B, for example, to be made smaller and/or lighter than the first motor 714A to further reduce the weight of the central PDU 706. Further, the second motor 714B may be particularly suitable for moving the inboard high-lift surfaces 204A, 204B by small amounts and/or at low movement rates to improve the performance of the aircraft 100 during cruise or other high speed flight conditions.

The first motor 714A and the second motor 714B may be selectively operated during different aircraft flight conditions. For example, the first motor 714A may be operated to drive the inboard high-lift surfaces 204A, 204B at a first aircraft speed (e.g., during low speed flight such as take-off and landing) and the second motor 714B may drive the inboard high-lift surfaces 204A, 204B at a second aircraft speed (e.g., during high speed flight conditions, including cruise conditions). At the second aircraft speed, the second brake 712B is released (e.g., activated) allowing the second motor 714B to drive the inboard high-lift surfaces 204A, 204B, and the first brake 712A is engaged to lock the first motor 714A. Further, the second motor 714B may be controlled or otherwise operated to drive the inboard high-lift surfaces 204A, 204B at a movement rate less than the first motor 714A.

Additionally or alternatively, the second motor 714B may be selectively operated to manipulate wing camber. For example, the second motor 714B may provide power for variable camber control of the inboard high-lift surfaces 204A, 204B and the first motor 714A may provide power for high lift control of the inboard-high-lift surfaces 204A, 204B. The second motor 714B may further be configured to move the inboard high-lift surfaces 204A, 204B by a small amount (e.g., a fraction of their full range of motion) to optimize the positions of the inboard high-lift surfaces 204A, 204B relative to the outboard high-lift surfaces 206A, 206B. For example, the second motor 714B may provide power to incrementally adjust the deflection angle of the inboard high-lift surfaces 204A, 204B by, e.g., 1% merely as a non-limiting example. As another example, the first motor 714A may provide power to move the inboard high-lift surfaces 204A, 204B by a first adjustment amount and the second motor 714B may provide power to move the inboard high-lift surfaces 204A, 204B by a second adjustment amount less than the first adjustment amount.

The controller 210 may be configured to operate (e.g., control, power and monitor) the central PDU 706, and the respective local PDUs 212, 302, 402 of the first and second outboard drive devices 704A, 704B to selectively electronically coordinate movement (e.g., synchronized movement and controlled differential movement) of the plurality of high-lift surfaces 202 into synchronized positions and different relative positions on at least one of the first wing 104A and the second wing 104B based on position information provided the plurality of position sensors 218 and/or skew sensors 222. The controller 210 may be a dual channel controller of the type described above having two independent control channels 724, 726 operably coupled to each of the central PDU 706, the respective local PDUs 212, 302, 402 of the first and second outboard drive devices 704A, 704B, including motors, brakes, and sensors. For example, a first independent control channel 724 (using a first power source) may selectively control and power the first motor 714A and first brake 712A of the central PDU 706, and a second independent control channel 726 (using a second power source) may selectively control and power the second motor 714B and second brake 712B of the central PDU 706. The sensors 218, 222 and brakes 710, if employed, may be dual channel and respectively interface with the first and second independent control channel 724, 726. The controller 210 may share feedback information between the channels 724 and 726 via a cross channel data link 728.

The controller 210 may be configured to operate the central PDU 706 to move the inboard high-lift surfaces 204A, 204B by selectively controlling and powering the two motor brake assemblies 716. For example, the controller 210 may be configured to operate the central PDU 706 to move the first and second inboard high-lift surfaces 204A, 204B a first adjustment amount by releasing the first brake 712A and driving the first motor 714A via the first independent control channel 724 in conjunction with locking the second motor 714B with the second brake 712B via the second independent control channel 726, and to move the first and second inboard high-lift surfaces 204A, 204B a second adjustment amount less than the first adjustment amount by releasing the second brake 712B and driving the second motor 714B via the second independent control channel 726 in conjunction with locking the first motor 714A with the first brake 712A via the first independent control channel 724. Additionally or alternatively, the controller 210 may be configured to release the first brake 712A and control the first motor 714A to drive the inboard high-lift surfaces 204A, 204B at a first aircraft speed and a first movement rate, and configured to release the second brake 712B and control the second motor 714B to drive the inboard high-lift surfaces 204A, 204B at a second aircraft speed greater than the first aircraft speed and a second movement rate less than the first movement rate. The second motor 714B may be locked via the second brake 712B at the first aircraft speed and the first motor 714A may be locked via the first brake 712A at the second aircraft speed. Alternatively, it may be acceptable under certain circumstances to operate both the first and second motors 714A, 714B simultaneously at the first aircraft speed and/or the second aircraft speed.

The control channel allocation for the first and second outboard drive devices 704A, 704B depends on the configuration of the local PDU 212. If the first and/or second outboard drive devices 704A, 704B include the local PDU 302 comprising two motors 304A, 304B in a torque sum arrangement 306 per the variant of FIGS. 3A-3C, one motor (e.g., motor 304A) of the respective local PDU 302 may be controlled and powered by the first independent control channel 724 using the first power source and the other motor (e.g., motor 304B) of the respective local PDU 302 may be controlled and powered by the second independent control channel 726 using the second power source. Accordingly, the controller 210 may be configured to electronically control the two motors 304A, 304B of the respective local PDU 302 to selectively drive the first and second outboard high-lift surfaces 206A, 206B to provide synchronized motion and differential motion between the first and second wings 104A, 104B, respectively. For example, the controller 210 may be configured to electronically synchronize operation of the first motor 714A of the central PDU 706 and the two motors (e.g., motors 304A and 304B) of the respective local PDUs 302 of the outboard drive devices 704A, 704B to symmetrically move the high-lift surfaces 202 simultaneously in unison. The second motor 714B of the central PDU 706 in this case may be locked via the second brake 712B, and may be used as back-up for the first motor 714A. As another example, the controller 210 may configured to lock the respective local PDUs 302 of the first and second outboard drive devices 704A, 704B and operate the central PDU 706 to vary a camber or otherwise manipulate a lift distribution of the first wing 104A and the second wing 104B by releasing the second brake 712B and driving the second motor 714B via the second independent control channel 726 to move the inboard high-lift surfaces 204A and 204B. The first brake 712A may be engaged to lock the first motor 714A.

If the first and/or second outboard drive device 704A, 704B comprises the local PDU 402 including a single motor 404 per the variant of FIGS. 4A-4B, the motor 404 of the respective local PDU 402 may interface with both the first and second independent control channels 724 and 726 and may be controlled by either one. The sensors 218 and fail-safe brakes 220 of the first and second outboard drive devices 704A, 704B are dual channel and interface with both the first and second independent control channel 724, 726. The controller 210 may be configured to operate the motor 404 of the respective local PDUs 402 of the first and second outboard drive devices 704A, 704B and one or both motors 714A, 714B of the central PDU 706 to electronically synchronize positions and electronically control differential positions of the high-lift surfaces 202.

The systems 200, 700 described herein enable independent and differential actuation of high-lift surfaces 202 on an aircraft 100 to facilitate performance gains such as reduced drag, the selective tailoring of the lift distribution along a wing span, wing load shifting to reduce wing bending, and fuel efficiency. The systems 200, 700 eliminate or at least reduce the requirement for differential gearboxes, which are heavy and occupy significant installation space. The systems 200, 700 may facilitate weight gains and simply control technology through the provision of either one or two independent control channels 224, 502, 504, 602, 604, 724, 726 as compared to conventional systems that rely on three or more dedicated control channels per high-lift surface, where the increased number of channels may result in penalties for additional power supply generate, cabling and power lines as each control channel may require a separate power supply, as well as increased control computer technology and computing complexity.

It will be appreciated that the aforementioned systems 200, 700, devices 208, 300, 400, 706, components and/or method may be modified to have some components and steps removed, or may have additional components and steps added, all of which are deemed to be within the spirit of the present disclosure. For example, the high-lift system 200, 700 may be used to independently actuate more than four high-lift surfaces 202 without departing from the scope of the present disclosure. The system 200 may employ an independent drive device 208 comprising the central PDU 706 described in connection with the system 700, and/or the centralized drive device 702 of the system 700 may employ a local PDU 302, 402 described in connection with FIG. 3A-3C or 4A-4B. Further, the system 700 may employ an independent drive device 208, 704A, 704B including the PDU 706 comprising a dual-motor speed summing arrangement (e.g., two motor brake assemblies 716 coupled to a speed sum gear assembly 718) as described in connection with FIG. 8. Accordingly, even though the present disclosure has been described in detail with reference to specific examples, it will be appreciated that the various modifications and changes can be made to these examples without departing from the scope of the present disclosure as set forth in the claims. It is anticipated and intended that future developments will occur in the technologies discussed herein, and that the disclosed method, device and/or article will be incorporated into such future developments. Thus, the specification and the drawings are to be regarded as an illustrative thought instead of merely restrictive thought.

Controller 210 may have a different configuration than that shown and/or described herein. For example, the drive devices 208, 702 may be controlled via any suitable form of feedback law(s). In various aspects, controller 210 may be implemented in analog form and/or digital form. For example, controller 210 may include one or more microcontrollers or other suitably programmed or programmable logic circuits. In various aspects, controller 210 may be incorporated with or operated in conjunction with a control system or subsystem of aircraft 100. Accordingly, controller 210 may be configured to communicate (e.g., transmit and/or receive data such as parameters, instructions, commands and status values) with one or more systems or subsystems of aircraft 100. The independent control channels 224 of the controller 210 may be in direct communication with the control system(s) or subsystem(s) of the aircraft 100 via a global communication data bus. For example, controller 210 may be part of an aircraft control system having a fly-by-wire configuration. Accordingly, the functionality of controller 210 may be integrated into and performed by one or more digital computer(s) or other data processors, sometimes referred to as flight control computers(s) (FCC) and related accessories that may control at least some aspects of performance of aircraft 100.

Controller 210 may also comprise memory(ies) including any storage means (e.g. devices) suitable for retrievably storing machine-readable instructions executable by one or more processors of controller 210. Such machine-readable instructions may be included in a computer program product. Memory(ies) may comprise any data storage devices suitable for storing data received and/or generated by controller 210, preferably retrievably. For example, memory (ies) may comprise media suitable for storing electronic data signals in volatile or non-volatile, non-transitory form. Machine-readable instructions for execution by controller 210 may cause controller 210 to generate control signals for controlling the operation of the PDUs 212, 706 and thereby control the deployment and retraction or one or more high-lift surfaces 202. In various aspects, controller 210 may be configured to cause the individual actuation of one or more high-lift surfaces 202 and/or the simultaneous actuation of a plurality of high-lift surfaces 202 either differentially or in unison. In the case of simultaneous deployment of a plurality of high-lift surfaces 202, controller 210 may, for example, be configured to carry out electronic gearing or camming where one of high-lift surfaces 202 may be operated as a master and one or more other high-lift surfaces 202 may be operated as one or more slaves. Control signals may be transmitted using any appropriate medium, including wireless, wireline, optical fiber cable, RF, or any suitable combination thereof. In various aspects, preset positions (e.g., selectable during aircraft operation either during flight or on ground) for a plurality of high-lift surfaces 202 may be stored and used by controller 210 to control the simultaneous and differential deployment or retraction of the plurality of high-lift surfaces 202.

As used herein, spatial or directional terms such as "inboard," "outboard," "top," "bottom," "upper," "lower," "up," "down," "left," "right," "first," "second," "third," and the like, relate to the illustrations shown in the figures and are not to be considered as limiting. Further, all numbers expressing dimensions, ratios and the like, used in the specification and claims, are to be understood to encompass tolerances and other deviations as represented by the term "about" or "approximately." Moreover, all ranges disclosed herein are to be understood to encompass any and all sub-ranges subsumed therein.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary. Further, the use of "at least one of" is intended to be inclusive, analogous to the term and/or. Additionally, use of adjectives such as first, second, etc. should be read to be interchangeable unless a claim recites an explicit limitation to the contrary.

What is claimed is:

1. A high-lift actuation system of an aircraft, comprising:
    a centralized drive device including a central power drive unit (PDU) operably coupled to a common central driveline for driving a first high-lift surface on a first wing and a second high-lift surface on a second wing, the common central driveline connecting the central PDU to a plurality of mechanical actuators coupled to the first high-lift surface and the second high-lift surface;
    a first local drive device including a first local PDU operably coupled to a first local driveline for driving a first local high-lift surface on the first wing;
    a second local drive device including a second local PDU operably coupled to a second local driveline for driving a second local high-lift surface on the second wing;
    wherein the first local driveline and the second local driveline are each spaced apart in the spanwise direction from the common central driveline without mechanically interacting with the common central driveline; and
    wherein the first local PDU and the second local PDU are selectively operable to move the first local high-lift surface and the second local high-lift surface, respectively, independently of each other and independently of the first and second high-lift surface.

2. The system of claim 1, further comprising a plurality of position sensors and a controller configured to control the central PDU, the first local PDU, and the second local PDU to selectively electronically coordinate movement of the plurality of high-lift surfaces based on position information provided by the plurality of position sensors.

3. The system of claim 1, wherein movement of the first high-lift surface and the second high-lift surface is mechanically synchronized via the common central driveline.

4. The system of claim 1, wherein the central PDU includes a first motor and a second motor engaged via respective motor outputs to a speed summing gearbox that couples the respective motor outputs of the first motor and the second motor in a speed summing manner.

5. The system of claim 4, wherein the first motor drives the first high-lift surface and the second high-lift surface at a first aircraft speed and the second motor drives the first high-lift surface and the second high-lift surface at a second aircraft speed greater than the first aircraft speed.

6. The system of claim 5, wherein the first motor is locked via a first motor brake at the second aircraft speed and the second motor is locked via a second motor brake at the first aircraft speed.

7. The system of claim 5, wherein the second motor has a capability rating less than that of the first motor and drives the first and second high-lift surfaces at a movement rate less than that of the first motor.

8. The system of claim 4, wherein the first motor is locked via a first motor brake and the second motor drives the first and second high-lift surfaces for variable camber operation.

9. The system of claim 4, wherein the first local PDU includes two motors having a respective motor output coupled together in a torque summing arrangement, wherein the torque summing arrangement torque sums the respective motor outputs of the two motors and transmits a combined torque to the first local driveline for driving the first local high-lift surface.

10. A high-lift actuation system of an aircraft, comprising:
at least two first high-lift surfaces disposed on a first wing and at least two second high-lift surfaces disposed on a second wing;
a centralized drive device including a central power drive unit (PDU) disposed between the first wing and the second wing operably coupled to a common central driveline for driving a first inboard high-lift surface of the at least two first high-lift surfaces on the first wing and a second inboard high-lift surface of the at least two second high-lift surfaces disposed on the second wing;
a first outboard drive device including a first local PDU disposed on the first wing operably coupled to a first outboard driveline for driving a first outboard high-lift surface of the at least two first high-lift surfaces on the first wing;
a second outboard drive device including a second local PDU disposed on the second wing operably coupled to a second outboard driveline for driving a second outboard high-lift surface of the at least two second high-lift surfaces on the second wing;
a controller configured to control the central PDU, the first local PDU, and the second local PDU to selectively electronically coordinate synchronized movement and controlled differential symmetrical movement of the at least two first and second high-lift surfaces;
wherein the central PDU includes two motor brake assemblies having a first motor with a first brake and a second motor with a second brake, a speed summing gear assembly configured to receive and speed sum a respective motor output of the first and second motors, and a speed reduction gear assembly mechanically coupled between the speed summing gear assembly and the common central driveline; and
wherein the first local PDU and the second local PDU include at least one motor mechanically coupled via a speed reduction gear assembly to the first outboard driveline and the second outboard driveline, respectively.

11. The system of claim 10, wherein the controller is a dual channel controller having two independent control channels operably coupled to each of the central PDU, the first local PDU and the second local PDU, and wherein a first of the two independent control channels selectively controls and powers the first motor and the first brake of the central PDU, and a second of the two independent control channels selectively controls and powers the second motor and the second brake of the central PDU.

12. The system of claim 11, wherein the controller is configured to operate the central PDU to move the first and second inboard high-lift surfaces a first adjustment amount by releasing the first brake and driving the first motor via the first independent control channel in conjunction with locking the second motor with the second brake via the second independent control channel; and
wherein the controller is configured to operate the central PDU to move the first and second inboard high-lift surfaces a second adjustment amount less than the first adjustment amount by releasing the second brake and driving the second motor via the second independent control channel in conjunction with locking the first motor with the first brake via the first independent control channel.

13. The system of claim 11, wherein the controller is configured to lock the first and second local PDU and operate the central PDU to vary a camber of the first wing and the second wing by releasing the second brake and driving the second motor via the second independent control channel to move the first and second inboard high-lift surfaces, wherein the first motor is locked with the first brake.

14. The system of claim 11, wherein the at least one motor of the first local PDU and of the second local PDU includes two motors respectively coupled to one of the two independent control channels and having a respective motor output coupled together in a torque summing arrangement, the torque summing arrangement structured and arranged to torque sum the respective motor outputs of the two motors and transmit a combined torque to the respective speed reduction gear assembly; and
wherein the controller is configured to electronically control the two motors of the first local PDU and of the second local PDU to selectively drive the first and second outboard high-lift surfaces to provide synchronized motion and differential motion between the first and second wings, respectively.

15. The system of claim 14, wherein the controller is configured to electronically synchronize operation of the first motor of the central PDU and the two motors of the first local PDU and of the second local PDU to symmetrically move the at least two first high-lift surfaces and the at least two second high-lift surfaces synchronously, and wherein the second motor of the central PDU is locked via the second brake.

16. The system of claim 11, wherein controller is configured to control the first motor to drive the first inboard high-lift surface and the second inboard high-lift surface at a first aircraft speed and a first movement rate, and control the second motor to drive the first inboard high-lift surface and the second inboard high-lift surface at a second aircraft speed greater than the first aircraft speed and a second movement rate less than the first movement rate, and wherein the second motor is locked via the second brake at the first aircraft speed and the first motor is locked via the first brake at the second aircraft speed.

17. The system of claim 11, wherein the second motor provides a capability rating less than that of the first motor, and wherein the controller is configured operate the central PDU to drive the first and second inboard high-lift surfaces via the first motor with the second brake engaged, and release the second brake to drive the first and second inboard high-lift surfaces via the second motor when a failure event disrupts the first motor from driving.

18. An aircraft having a central longitudinal axis, comprising:
a fuselage;
a first wing including a first inboard high-lift surface and a first outboard high-lift surface;
a second wing including a second inboard high-lift surface and a second outboard high-lift surface;
a centralized drive device for centralized control of the first inboard high-lift surface and the second inboard high-lift surface, the centralized drive device including a central power drive unit (PDU) disposed in the fuselage coupled to a common central driveline extending in a spanwise direction through the central longitudinal axis and connecting the central PDU to a plurality of mechanical actuators coupled to the first inboard high-lift surface and the second inboard high-lift surface;

a first outboard drive device including a first local PDU disposed on the first wing remote from the central longitudinal axis operably coupled to a first outboard driveline for driving the first outboard high-lift surface;

a second outboard drive device including a second local PDU disposed on the second wing remote from the central longitudinal axis operably coupled to a second outboard driveline for driving the second outboard high-lift surface; and a dual channel controller having two independent control channels coupled to each of the central PDU, the first local PDU, and the second local PDU to selectively electronically coordinate synchronized movement and controlled differential movement of the first inboard high-lift surface, the first outboard high-lift surface, the second inboard high-lift surface, and second outboard high-lift surface.

19. The aircraft of claim 18, wherein:

the common central driveline mechanically synchronizes motion of the first inboard high-lift surface and the second inboard high-lift surface, the common central driveline being spaced apart in the spanwise direction from each of the first outboard driveline and the second outboard driveline without mechanical interaction;

the central PDU includes two independently operable motors having a respective motor output coupled to a speed summing gear assembly, the two motors including a first motor with a first brake coupled to a first of the two independent control channels and a second motor with a second brake coupled to a second of the two independent control channels; and the controller is configured to vary a camber of the first wing and the second wing by releasing the second brake and driving the second motor via the second independent control channel to move the first and second inboard high-lift surfaces independently of the first and second outboard high-lift surfaces, wherein the first motor is locked with the first brake.

* * * * *